US012683767B2

(12) United States Patent
Karthikeyan et al.

(10) Patent No.: US 12,683,767 B2
(45) Date of Patent: Jul. 14, 2026

(54) CONTACT CENTER PASSWORDLESS AUTHENTICATION

(71) Applicant: Genesys Cloud Services, Inc., Menlo Park, CA (US)

(72) Inventors: Santhosh Kumar Karthikeyan, Chennai (IN); Vinoth Saravanan, Chennai (IN); Monisha Padmavathi Ragavan, Chennai (IN); Asmitha Durairaj, Chennai (IN); Vinoth Subramaniam, Chennai (IN); Mohamed Uvaiz Anwar Batcha, Chennai (IN); Praveen Kumar Anandadoss, Chennai (IN)

(73) Assignee: Genesys Cloud Services, Inc., Menlo Park, CA (US)

( * ) Notice: Subject to any disclaimer, the term of this patent is extended or adjusted under 35 U.S.C. 154(b) by 88 days.

(21) Appl. No.: 18/104,033

(22) Filed: Jan. 31, 2023

(65) Prior Publication Data

US 2024/0259190 A1 Aug. 1, 2024

(51) Int. Cl.
*H04L 9/08* (2006.01)
*H04L 9/32* (2006.01)

(52) U.S. Cl.
CPC .......... *H04L 9/0825* (2013.01); *H04L 9/3231* (2013.01); *H04L 9/3271* (2013.01)

(58) Field of Classification Search
CPC ..... H04L 9/08; H04L 9/30; H04L 9/32; H04L 9/40; H04L 9/0825; H04L 9/0891;
(Continued)

(56) References Cited

U.S. PATENT DOCUMENTS

| | | | |
|---|---|---|---|
| 10,587,603 B2 * | 3/2020 | Lingamallu | H04L 67/02 |
| 11,107,080 B2 * | 8/2021 | Malik | H04L 63/0807 |

(Continued)

FOREIGN PATENT DOCUMENTS

WO WO-2020236651 A1 * 11/2020 ........... H04L 9/3231

OTHER PUBLICATIONS

Apple Inc.; Passkeys; Developer; available at https://developer.apple.com/passkeys/; last accessed Jan. 23, 2023; 3 pages.

(Continued)

*Primary Examiner* — James N Fiorillo
(74) *Attorney, Agent, or Firm* — Taft Stettinius & Hollister LLP

(57) ABSTRACT

A method for authenticating a contact center user to a contact center agent includes a cloud system, to which the agent is securely authenticated, triggering a sending of an electronic message to a user device. The user device has one or more biometric authentication features, which it requires to access a private key, of a key pair, securely stored on the user device. The electronic message contains a validation link or a trigger for a validation prompt. A passkey system stores an agent identifier, a user identifier, an interaction identifier, and a credential identifier in a database, in response receiving a positive authentication status from a business web server indicating that the business web server has authenticated the customer device by passkey. In response to the passkey system receiving the positive authentication status, the passkey system transmits an authentication status notification indicating the positive authentication status to the cloud system.

15 Claims, 14 Drawing Sheets

(58) Field of Classification Search

CPC ... H04L 9/3226; H04L 9/3231; H04L 9/3247; H04L 9/3271; H04L 63/08; H04L 63/0861; G06Q 10/10; G06Q 30/018; G06Q 30/0185; G06Q 30/0207; G06Q 30/0225; G06Q 30/0241; G06Q 30/0248; G06Q 30/0609; G06Q 50/26; G06Q 50/265

USPC ........................................................ 713/171

See application file for complete search history.

(56) References Cited

U.S. PATENT DOCUMENTS

| | | | | |
|---|---|---|---|---|
| 2013/0045713 | A1* | 2/2013 | Foster ..................... | H04L 63/18 |
| | | | | 455/411 |
| 2013/0086642 | A1* | 4/2013 | Resch ..................... | H04L 9/321 |
| | | | | 726/4 |
| 2013/0185815 | A1* | 7/2013 | Leotsarakos ............ | G06F 21/62 |
| | | | | 726/30 |
| 2013/0232503 | A1* | 9/2013 | Volvovski ........... | G06F 21/6218 |
| | | | | 718/104 |
| 2013/0238900 | A1* | 9/2013 | Leggette ............... | G06F 9/5077 |
| | | | | 713/165 |
| 2015/0023360 | A1* | 1/2015 | Wills ..................... | H04L 67/55 |
| | | | | 370/401 |
| 2016/0065558 | A1* | 3/2016 | Suresh .................... | G06F 21/32 |
| | | | | 726/7 |
| 2016/0277999 | A1* | 9/2016 | Graves .................. | H04L 67/563 |
| 2021/0135856 | A1* | 5/2021 | Adibi .................... | H04L 9/0643 |
| 2022/0303257 | A1* | 9/2022 | Bhansali ............. | H04L 63/0876 |
| 2023/0396607 | A1* | 12/2023 | Mondello ........... | H04L 63/0823 |
| 2024/0073024 | A1* | 2/2024 | Bertocci ............... | H04L 63/126 |
| 2024/0259190 | A1* | 8/2024 | Karthikeyan ...... | G06Q 30/0225 |

OTHER PUBLICATIONS

Apple Inc.; Meet Passkeys, video transcript; Developer; available at https://developer.apple.com/videos/all-videos/?q=passkeys; last accessed Jan. 23, 2023; 10 pages.

Google Developers; Passwordless login with passkeys; Google Identity; available at https://developers.google.com/identity/passkeys; last accessed Jan. 31, 2023; 5 pages.

International Search Report; European Patent Office; International Patent Application No. PCT/US2024/013809; Apr. 15, 2024; 4 pages.

Written Opinion of the International Searching Authority; European Patent Office; International Patent Application No. PCT/US2024/013809; Apr. 15, 2024; 5 pages.

International Preliminary Report on Patentability; International Preliminary Examining Authority; International Patent Application No. PCT/US24/13809; Jan. 8, 2025; 9 pages.

Anonymous: Web Authentication: An API for accessing Public Key Credentials—Level 2: Apr. 8, 2021; 166 pages. https://www.w3.org/TR/webauthn-2/#sctn-cryptographic-challenges.

* cited by examiner

AGENT REGISTRATION/AUTHENTICATION ARCHITECTURE

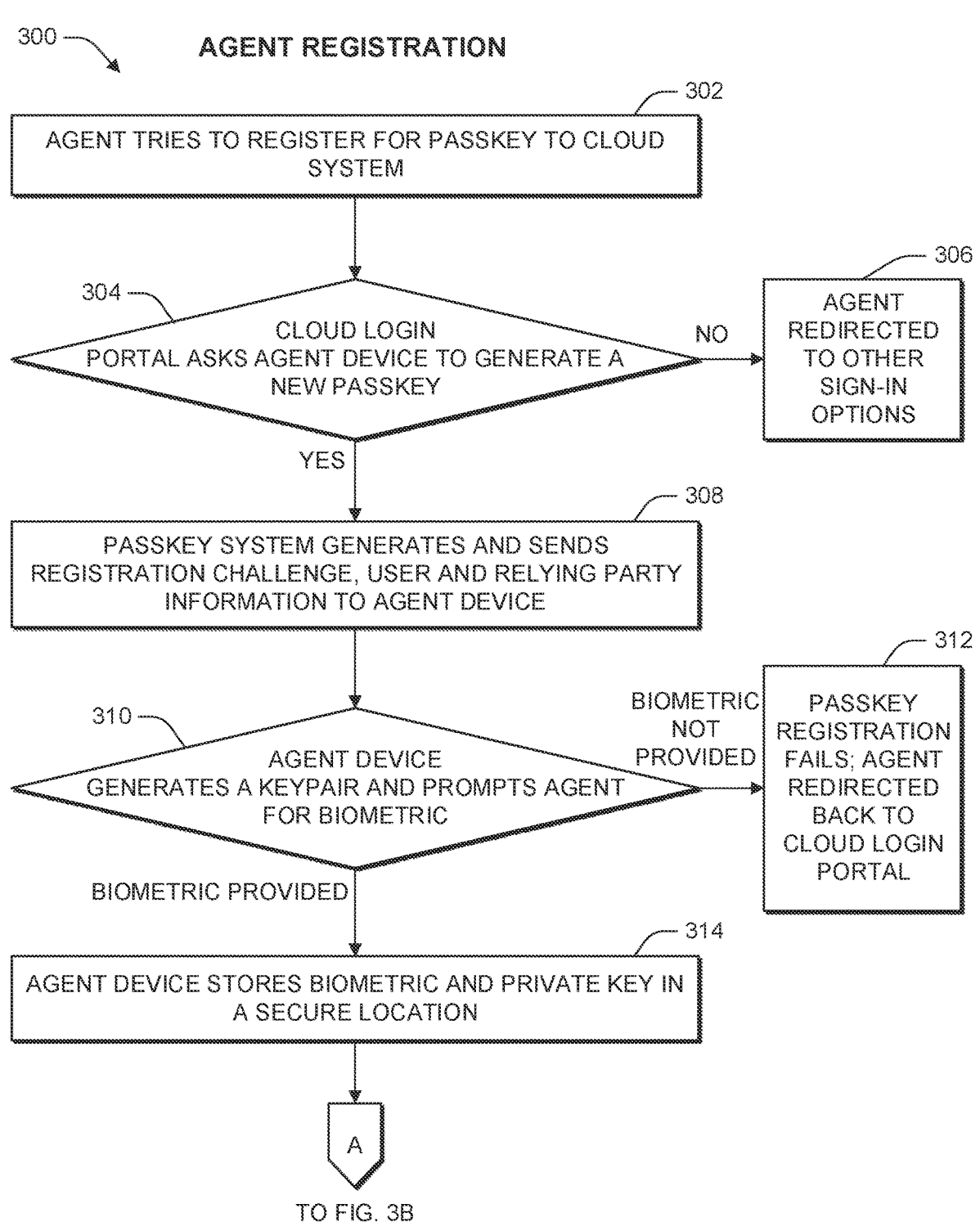

300 —

AGENT REGISTRATION

302

AGENT TRIES TO REGISTER FOR PASSKEY TO CLOUD SYSTEM

304

CLOUD LOGIN PORTAL ASKS AGENT DEVICE TO GENERATE A NEW PASSKEY

NO → 306 — AGENT REDIRECTED TO OTHER SIGN-IN OPTIONS

YES

308

PASSKEY SYSTEM GENERATES AND SENDS REGISTRATION CHALLENGE, USER AND RELYING PARTY INFORMATION TO AGENT DEVICE

310

AGENT DEVICE GENERATES A KEYPAIR AND PROMPTS AGENT FOR BIOMETRIC

BIOMETRIC NOT PROVIDED → 312 — PASSKEY REGISTRATION FAILS; AGENT REDIRECTED BACK TO CLOUD LOGIN PORTAL

BIOMETRIC PROVIDED

314

AGENT DEVICE STORES BIOMETRIC AND PRIVATE KEY IN A SECURE LOCATION

AGENT REGISTRATION (CONT.)

350

FROM FIG. 3A

A

352
AGENT DEVICE GENERATES
ASSERTION AND CREDENTIAL ID

354
AGENT DEVICE SHARES CREDENTIAL ID, PUBLIC KEY AND
ASSERTION TO PASSKEY SYSTEM

356
PASSKEY SYSTEM VALIDATES AND STORES PUBLIC KEY
AND CREDENTIAL ID TO DATABASE

358
AGENT SUCCESSFULLY REGISTERED WITH CLOUD
SYSTEM USING PASSKEY CREDENTIAL

450 —

AGENT LOGIN (CONT.)

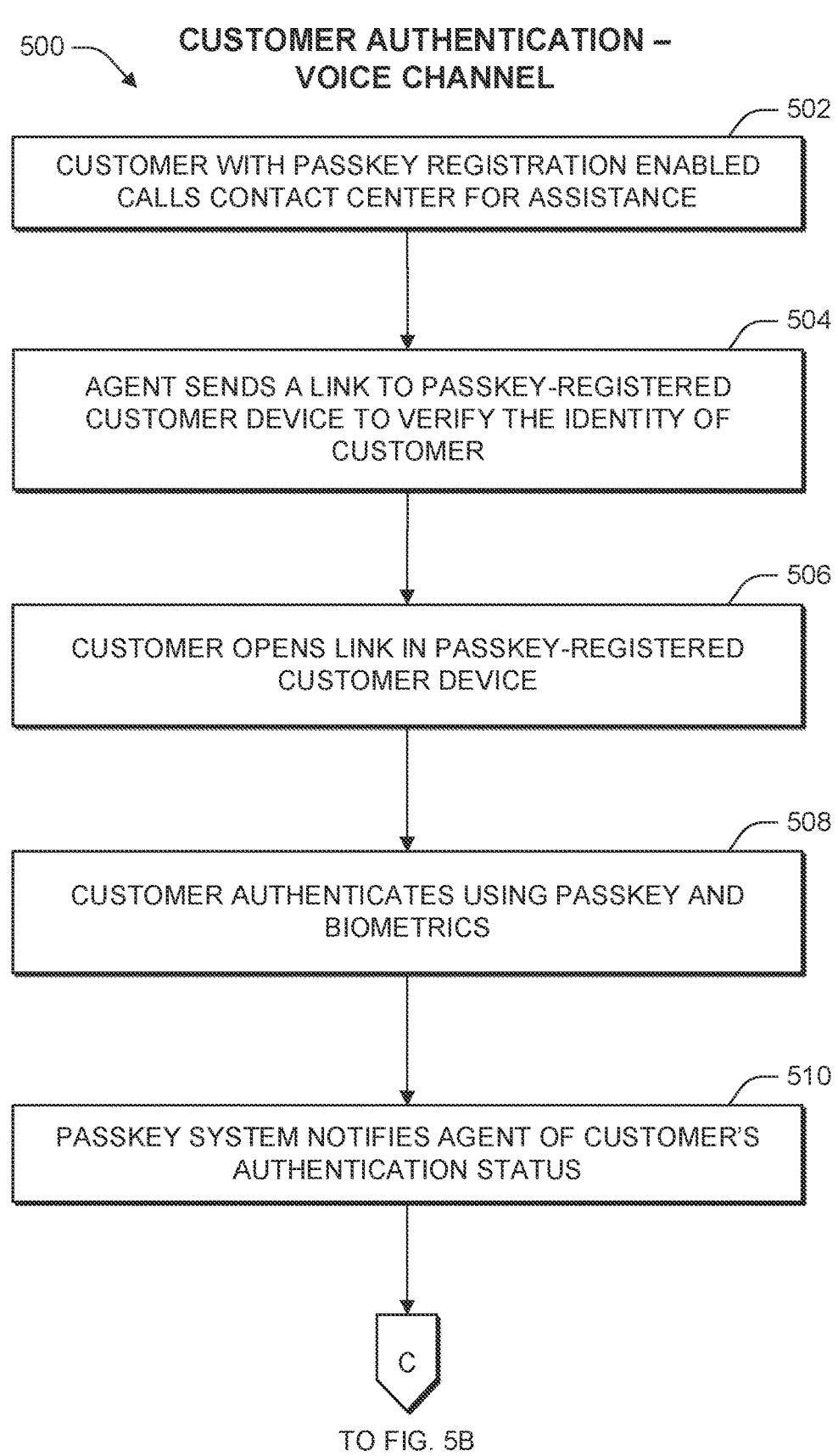

CUSTOMER AUTHENTICATION –
VOICE CHANNEL

500 —

502

CUSTOMER WITH PASSKEY REGISTRATION ENABLED
CALLS CONTACT CENTER FOR ASSISTANCE

504

AGENT SENDS A LINK TO PASSKEY-REGISTERED
CUSTOMER DEVICE TO VERIFY THE IDENTITY OF
CUSTOMER

506

CUSTOMER OPENS LINK IN PASSKEY-REGISTERED
CUSTOMER DEVICE

508

CUSTOMER AUTHENTICATES USING PASSKEY AND
BIOMETRICS

510

PASSKEY SYSTEM NOTIFIES AGENT OF CUSTOMER'S
AUTHENTICATION STATUS

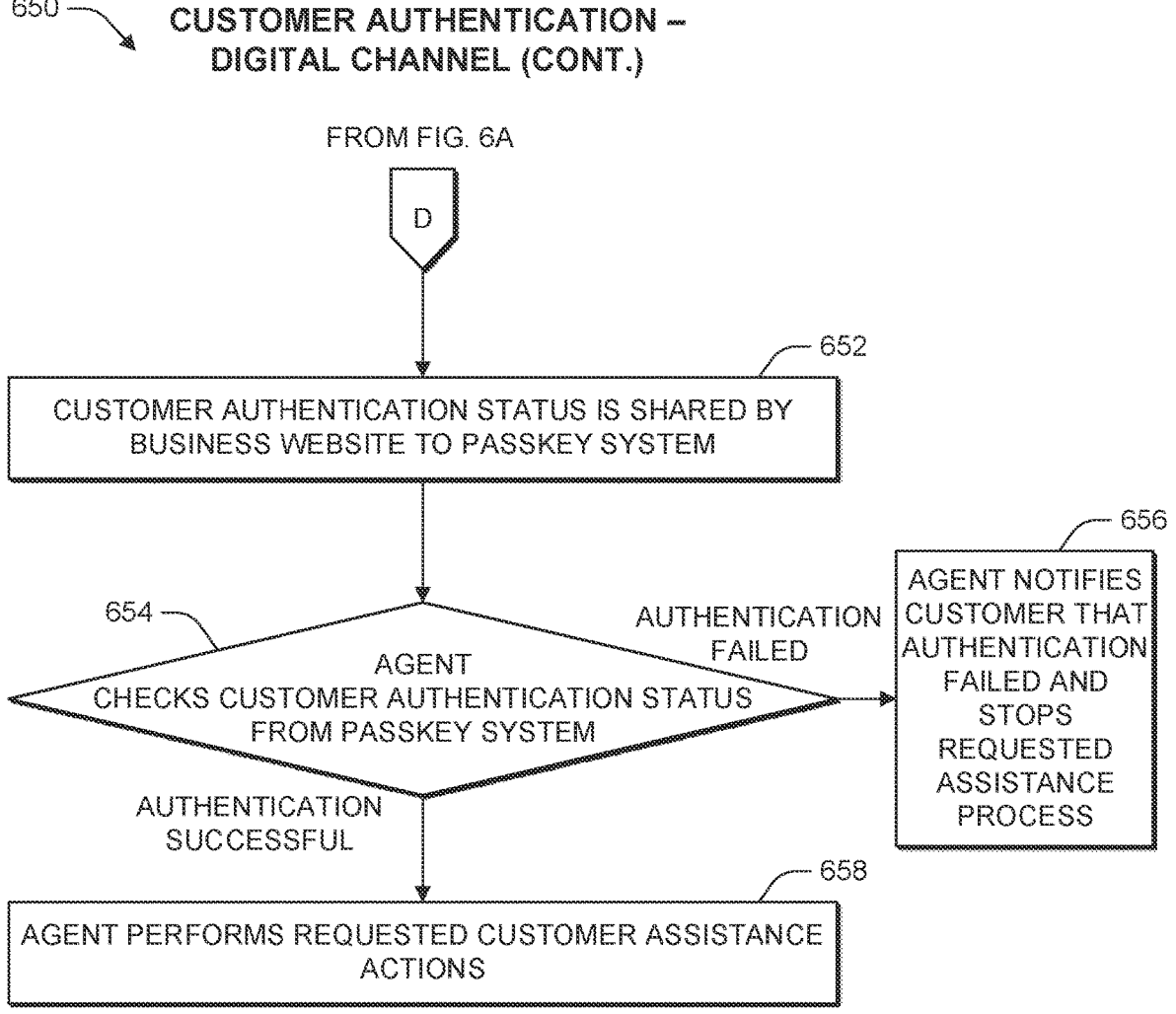

650

CUSTOMER AUTHENTICATION –
DIGITAL CHANNEL (CONT.)

FROM FIG. 6A

D

652

CUSTOMER AUTHENTICATION STATUS IS SHARED BY
BUSINESS WEBSITE TO PASSKEY SYSTEM

656

AGENT NOTIFIES
CUSTOMER THAT
AUTHENTICATION
FAILED AND
STOPS
REQUESTED
ASSISTANCE
PROCESS

654

AGENT
CHECKS CUSTOMER AUTHENTICATION STATUS
FROM PASSKEY SYSTEM

AUTHENTICATION
FAILED

AUTHENTICATION
SUCCESSFUL

658

AGENT PERFORMS REQUESTED CUSTOMER ASSISTANCE
ACTIONS

**CONTACT CENTER
CUSTOMER AUTHENTICATION**

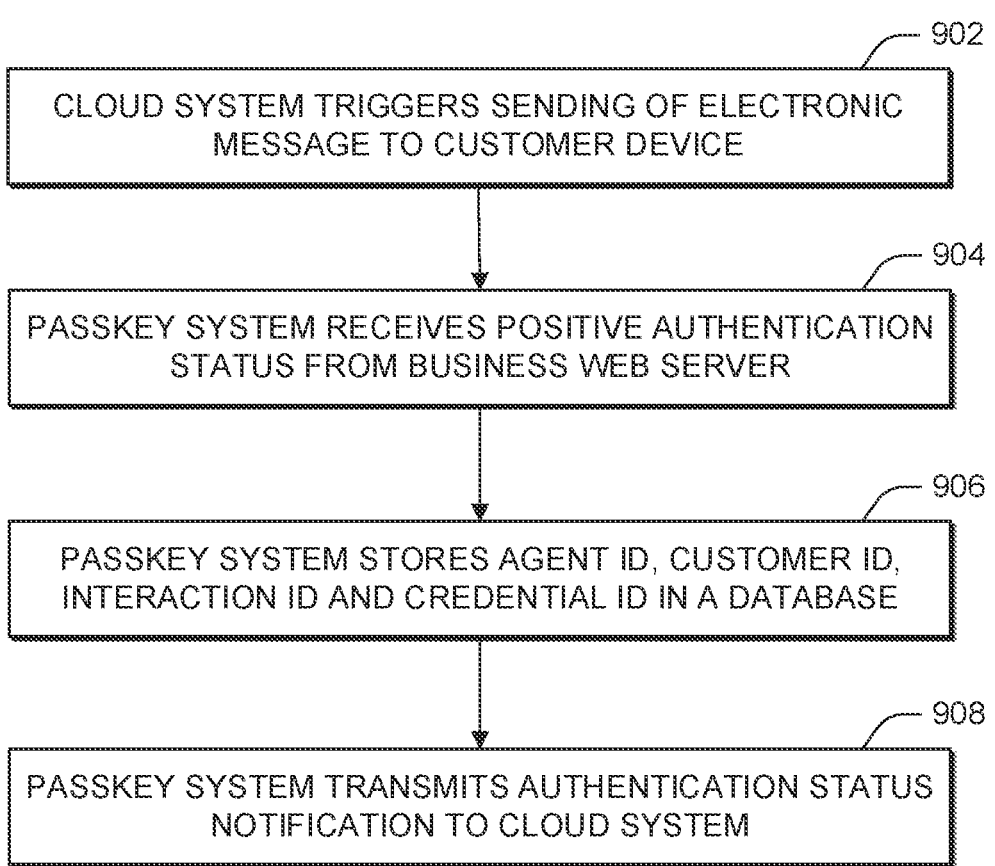

902

CLOUD SYSTEM TRIGGERS SENDING OF ELECTRONIC
MESSAGE TO CUSTOMER DEVICE

904

PASSKEY SYSTEM RECEIVES POSITIVE AUTHENTICATION
STATUS FROM BUSINESS WEB SERVER

906

PASSKEY SYSTEM STORES AGENT ID, CUSTOMER ID,
INTERACTION ID AND CREDENTIAL ID IN A DATABASE

908

PASSKEY SYSTEM TRANSMITS AUTHENTICATION STATUS
NOTIFICATION TO CLOUD SYSTEM

FIG. 9

CONTACT CENTER PASSWORDLESS AUTHENTICATION

BACKGROUND

A user account can be compromised by phishing of a password, or by unauthorized acquisition of the password from a different account belonging to the same user owing to password re-use by the user. The FIDO (Fast Identity Online) Alliance multi-device credentials known as passkeys are a phishing-resistant alternative to passwords that reduce end-user friction in consumer applications. The FIDO2 specification, which includes the World Wide Web Consortium (W3C) Web Authentication (WebAuthn) standard and the FIDO Client to Authenticator Protocol 2 (CTAP2), defines how authenticators (e.g., physical keys and security hardware on devices) can communicate with web browsers and how a client-side (e.g., JavaScript) application-programmer interface (API) can be used by websites to access authenticators so as to perform public key cryptography authentication. The security hardware can be gated by one or more biometric sensors such as fingerprint sensors or facial recognizers. A passkey credential can roam across multiple devices (e.g., within a single vendor ecosystem), allowing it to be backed up to the cloud, for example, and obviating the need to repeat enrollments on multiple devices.

SUMMARY

According to an embodiment, a method for authenticating a contact center user to a contact center agent includes triggering, by a cloud system to which the agent is securely authenticated, a sending of an electronic message to a user device. The user device has one or more biometric authentication features, stores a private key of a passkey pair, and requires biometric authentication to access the private key. The electronic message contains a validation link or a trigger for a validation prompt. A passkey system stores an agent identifier, a user identifier, an interaction identifier, and a credential identifier in a database in response to the passkey system receiving a positive authentication status from a business web server indicating that the business web server has authenticated the user device by passkey. In response to the passkey system receiving the positive authentication status, the passkey system transmits an authentication status notification indicating the positive authentication status to the cloud system.

In some embodiments, the passkey system is hosted in a cloud. The contact center management system is also hosted in the cloud. The passkey system receives the agent identifier, the user identifier, and the interaction identifier from the contact center management system in response to triggering the sending of the electronic message.

In some embodiments, the agent is securely authenticated to the cloud system by passkey.

In some embodiments, the agent is securely authenticated to the cloud system by a login portal of the cloud system providing an option to sign in using a passkey. The passkey system receives a username from the login portal. The passkey system retrieves a credential identifier and an agent public key from the database. The passkey system sends a login challenge to an agent device. The passkey system receives a signed login challenge from the agent device. The passkey system decodes the signed login challenge using the agent public key. The passkey system compares the decoded login challenge with the sent login challenge.

In some embodiments, the electronic message is sent via a message communication channel that is based on a type of interaction communication channel by which the user interacts with the agent.

In some embodiments, the electronic message contains the validation link and is sent via a short message service (SMS) text message or an email message. In other embodiments, the electronic message contains the trigger for the validation prompt is sent as a push notification to a client-side script in a web browser.

According to another embodiment, a system for authenticating a contact center user to a contact center agent includes at least one processor and at least one memory comprising a plurality of instructions stored therein that, in response to execution by the at least one processor, causes the system to trigger, by a cloud system to which the agent is securely authenticated, a sending of an electronic message to a user device. The user device has one or more biometric authentication features. The user device stores a private key of a passkey pair and requires biometric authentication to access the private key. The electronic message contains a validation link or a trigger for a validation prompt. The instructions further cause the system to store, by a passkey system, an agent identifier, a user identifier, an interaction identifier, and a credential identifier in a database in response to the passkey system receiving a positive authentication status from a business web server indicating that the business web server has authenticated the user device by passkey. The instructions further cause the system to transmit, by the passkey system, an authentication status notification indicating the positive authentication status to the cloud system in response to the passkey system receiving the positive authentication status.

In some embodiments, the passkey system is hosted in a cloud, and the instructions further cause the system to receive, by the passkey system, the agent identifier, the user identifier, and the interaction identifier from a contact center management system hosted in the cloud in response to triggering the sending of the electronic message.

In some embodiments, the agent is securely authenticated to the cloud system by passkey.

In some embodiments, the cloud system includes a login portal, and the passkey system is configured to provide an option to sign in using a passkey; receive a username from the login portal; retrieve a credential identifier and an agent public key from the database; send a login challenge to an agent device; receive a signed login challenge from the agent device; decode the signed login challenge using the agent public key; and compare the decoded login challenge with the sent login challenge.

In some embodiments, the electronic message is sent via a message communication channel that is based on a type of interaction communication channel by which the user interacts with the agent.

In some embodiments, the electronic message contains the validation link and is sent via an SMS text message or an email message. In other embodiments, the electronic message contains the trigger for the validation prompt and is sent as a push notification to a client-side script in a web browser.

According to yet another embodiment, one or more non-transitory computer-readable media include a plurality of instructions stored thereon that, in response to execution by at least one processor, cause the at least one processor to authenticate a contact center user to a contact center agent by triggering a sending of an electronic message to a user device having one or more biometric authentication features.

The user device stores a private key of a passkey pair and requires biometric authentication to access the private key. The electronic message contains a validation link or a trigger for a validation prompt. The plurality of instructions further cause the at least one processor to store an agent identifier, a user identifier, an interaction identifier and a credential identifier in a database in response to receiving a positive authentication status from a business web server indicating that the business web server has authenticated the user device by passkey. The plurality of instructions further cause the at least one processor to transmit an authentication status notification indicating the positive authentication status.

In some embodiments, the computer-readable media are hosted in a cloud, and the plurality of instructions further cause the at least one processor to receive the agent identifier, the user identifier, and the interaction identifier in response to triggering the sending of the electronic message.

In some embodiments, the plurality of instructions further cause the at least one processor to provide an option to sign in using a passkey; receive a username from a login portal; retrieve a credential identifier and an agent public key from the database; send a login challenge to an agent device; receive a signed login challenge from the agent device; decode the signed login challenge using the agent public key; and compare the decoded login challenge with the sent login challenge.

In some embodiments, the plurality of instructions further cause the at least one processor to send the electronic message via a message communication channel that is based on a type of interaction communication channel by which the user interacts with the agent.

In some embodiments, the plurality of instructions further cause the at least one processor to send the electronic message containing the validation link as an SMS text message or as an email message. In other embodiments, the plurality of instructions further cause the at least one processor to send the electronic message containing the trigger for the validation prompt as a push notification to a client-side script in a web browser.

This summary is not intended to identify key or essential features of the claimed subject matter, nor is it intended to be used as an aid in limiting the scope of the claimed subject matter. Further embodiments, forms, features, and aspects of the present application shall become apparent from the description and figures provided herewith.

BRIEF DESCRIPTION OF THE DRAWINGS

The concepts described herein are by way of example and not by way of limitation in the accompanying figures. For simplicity and clarity of illustration, elements illustrated in the figures are not necessarily drawn to scale. Where considered appropriate, references labels have been repeated among the figures to indicate corresponding or analogous elements.

FIGS. 3A and 3B are a flow diagram of an example method for agent registration using passkeys.

FIGS. 5A and 5B are a flow diagram of an example method for customer authentication using a voice channel for agent-customer communications.

FIGS. 6A and 6B are a flow diagram of an example method for customer authentication using a digital channel for agent-customer communications.

FIG. 9 is a flowchart illustrating an example method of contact center customer authentication.

DETAILED DESCRIPTION

Figure 1:
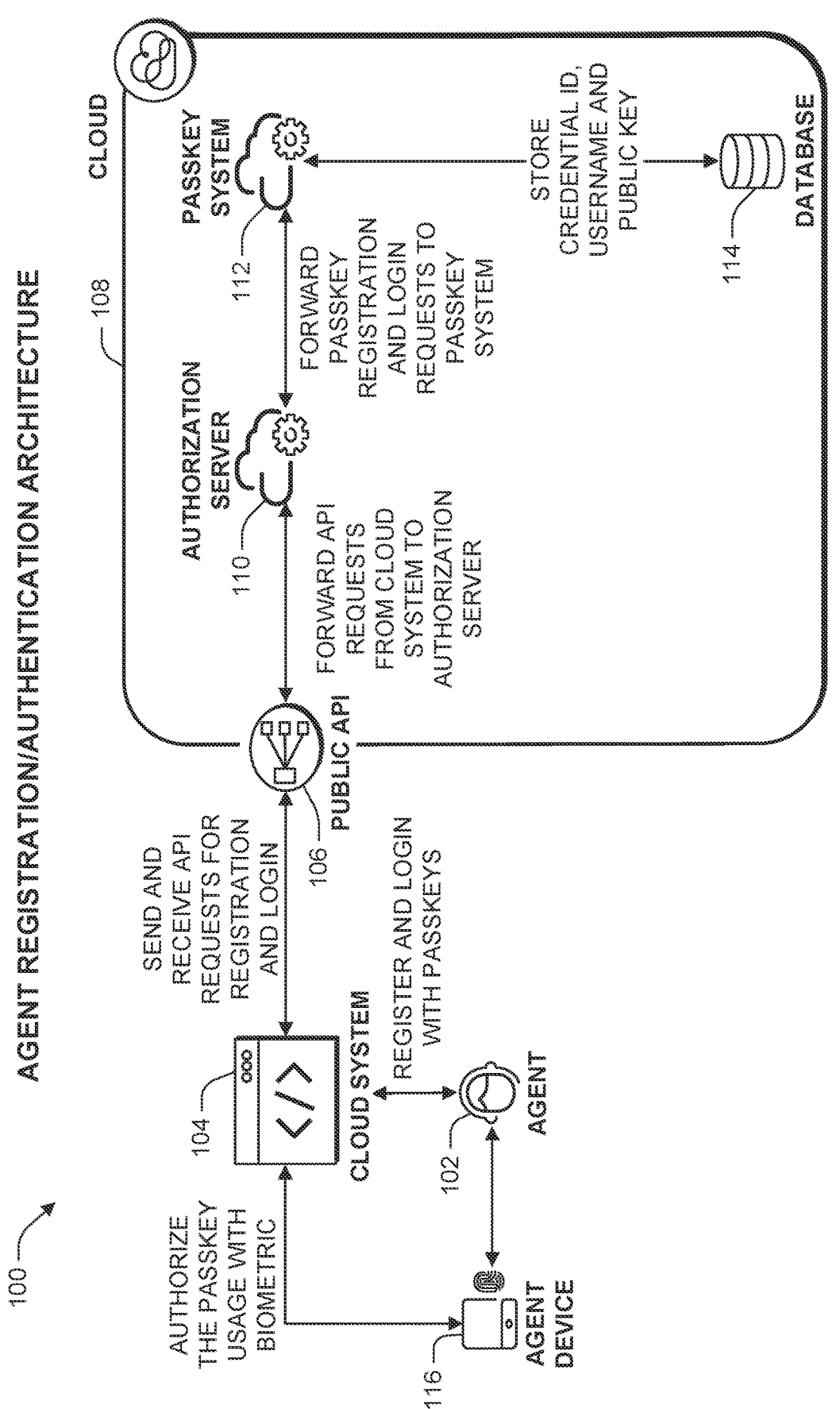
FIG. 1 is a block diagram of an example contact center system for agent authentication.

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrated embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Although reference to a "preferred" component or feature may indicate the desirability of a particular component or feature with respect to an embodiment, the disclosure is not so limiting with respect to other embodiments, which may omit such a component or feature. Further, when a particular feature, structure, or characteristic is described in connection with an embodiment, it is submitted that it is within the knowledge of one skilled in the art to implement such feature, structure, or characteristic in connection with other embodiments whether or not explicitly described. Further, particular features, structures, or characteristics may be combined in any suitable combinations and/or sub-combinations in various embodiments.

Additionally, items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C). Further, with respect to the claims, the use of words and phrases such as "a," "an," "at least one," and/or "at least one portion" should not be interpreted so as to be limiting to only one such element unless specifically stated to the contrary, and the use of phrases such as "at least a portion" and/or "a portion" should be interpreted as encompassing both embodiments including only a portion of such element and embodiments including the entirety of such element unless specifically stated to the contrary.

The disclosed embodiments may, in some cases, be implemented in hardware, firmware, software, or a combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, such specific arrangements and/or orderings may not be required. Rather, in some embodiments, such features may be arranged in a different manner and/or order than shown in the figures unless indicated to the contrary. Additionally, the inclusion of a structural or method feature in a particular figure is not meant to imply that such feature is required in all embodiments and, in some embodiments, may not be included or may be combined with other features.

In the context of contact center operations, a contact center agent may need to securely login to a contact center management application, which may be hosted in the cloud, and is sometimes referred to herein as a cloud system. Conventional login methods may use passwords and/or two-factor authentications with one-time-use passwords or tokens. Additionally, the contact center agent may subsequently need to confirm the identity of a customer (e.g., a user) who has contacted the agent via the contact center before carrying out functions to assist the customer. For example, the agent may ask the customer to login to a secure online system using a password and/or two-factor authentication, or the agent may ask the customer for information presumed to be known only by the customer, such as answers to one or more security questions (e.g., "Who was your first grade teacher?") or personal information (e.g., a home address or a Social Security number or portion thereof).

However, these authentication methods have drawbacks. A customer may feel uncomfortable sharing sensitive personal information with a contact center agent. Passwords or other authenticating information can be forgotten or stored in insecure ways. Access to password vaults, where passwords can be securely stored electronically, can be lost. Moreover, passwords and other authenticating information may be obtained by a bad-actor impersonator. As examples, customer authentication based on passwords or passphrases can be manipulated through social engineering methods such as phishing (wherein an attacker tricks a user into typing a password into a malicious website controlled by the attacker), sniffing (wherein an attacker infiltrates an insecure, unencrypted wireless or wired network), or by installing a hardware or software keylogger on a computer used to enter a password. Insufficiently complex passwords can be guessed, and such guessing can be made more effective through automation. Password reuse across multiple accounts can permit a bad actor to obtain access to a security-critical account, such as a bank account, by obtaining a password to a less security-critical account, such as an online posting forum. In order to check them, passwords are required to be stored server-side, meaning that hacks of or leaks from the businesses that store them can expose the passwords to bad actors, who may be able to decrypt the passwords if the passwords are stored in encrypted form. Bad actors can use stolen personal information of legitimate customers to access accounts for monetary gain. Agents may struggle to detect identity theft when bad actors have accurate customer information.

The FIDO2 authentication standard enables users to leverage common devices to authenticate to online services in both mobile and desktop environments, thereby, enhancing security. The FIDO2 specifications can be implemented in a passkey system to provide a passkey-based, high-security experience to contact center agents and customers of contact centers. The passkey system can be embodied, for example, as a cloud service, e.g., as a microservice. The passkey system can operate alongside an authorization server to replace a password-based mechanism with the FIDO2 passwordless standards and thus to enable passwordless authentication.

The passkey-based systems and methods described herein empower customers to authenticate themselves through passkeys generated for a business domain with biometrics like fingerprint identification or face identification. Because the passkey system obviates the need to use passwords or personal identification numbers (PINs) to prove identity, the passkey-based systems and methods provide a highly secure environment to authorize customers in contact center scenarios.

Passkey-based systems and methods, as described herein, can be used in both voice channels (e.g., phone calls) and digital channels (e.g., chat and video calls), wherein an agent's validating a customer's identity to act on the customer's request is a critical task. Passkeys allow customers to be authenticated without having to enter a password or provide any other authentication factors (such as answers to security questions).

A passkey comprises a key pair. Each key in the key pair can be embodied, for example, as a digital file or portion thereof stored in a non-transitory memory. A first key of the key pair is a public key intended to be shared with an identity-authorizing entity. A second key of the key pair is a private key, intended to be held securely within a device controlled by the entity to be authorized by the identity-authorizing entity. The key pair can be created using known cryptography techniques to ensure a strong, private relationship between the device to be authorized and the authorizing entity (e.g., a website, an app, or a contact center).

In examples described herein, when a customer service agent wants to login to a web-based or desktop version of a contact-center control application, the login request can be directed to an authorization server through which a method to register using passkeys can be provided. When the contact center agent registers for a passkey credential, a public/private key pair is generated by a trusted physical device in the control of the agent, and a credential ID and a public key of the key pair is sent to a passkey system. The credential ID and the public key can be stored in a database (e.g., a NoSQL database). In the agent device, the credential ID and the private key for the domain are stored securely as defined by platform rules. Here, the "platform" refers to the operating system of the agent device, such as Android™, iOS®, Mac®, Linux®, Windows®, etc., which supports the FIDO2 specifications.

Once the agent successfully registers a passkey, the option to use the passkey for authentication to the contact center control application will be shown in a login portal of the contact center control application. Upon an attempted login, the passkey system can send a challenge to the agent device, which will be signed (encoded) at the agent device using the private key stored securely in the agent device. A signed response can then be sent by the agent, authenticating the agent's identity by providing a match to a biometric earlier collected by the agent device. The signed response can be validated by the passkey system with the stored public key for the corresponding credential ID. If the validation is successful, the agent is then authorized by the authorization server.

When a customer reaches a contact center agent through a voice channel, the agent can be provided with an option to send an electronic message (e.g., an SMS text message or an email message) to the customer. The electronic message can include a link to a login portal of a business website. In some examples, a client-side application (e.g., a JavaScript application) running on the business website can prompt the end user to validate with a passkey. Upon customer validation, the status of the validation can be notified by a business webserver to the passkey system, which in turn can notify the agent. When a customer reaches a contact center agent through a digital channel, in which the customer may, for example, text-chat or video call from the business website, the customer's identity can be validated using a passkey by the business website and successful customer authentication can be notified to the passkey system through the client-side application.

The passkey-based architectures and methods described herein thus provide more secure agent and customer identity authentication than previously available using passwords alone or passwords in conjunction with another authentication factor. Contact center agents can sign up and login to contact center control applications from any device without the need for a password or one-time token, which are vulnerable to social engineering attacks like phishing, spoofing, and keylogging. The passkey-based architectures and methods described herein also help businesses to authenticate the identities of customers using the customers' own devices (e.g., smartphones) and biometrics. The passkey-based contact center architectures and methods described herein help identify customers in both voice and digital communication channels prior to agents performing any account-related actions on the customers' behalf.

The passkey-based contact center architectures and methods described herein provide a secure and relatively hassle-free ("frictionless") authentication experience. The passkey system can operate alongside an authorization server and can implement WebAuthn and CTAP2 protocols. The browser and operating system can ensure that a passkey can only be used with the website or app for which the passkey was created. This frees customers from needing to be responsible for ensuring that the website or app that they are signing into is genuine.

FIG. 1 illustrates an example architecture 100 for registration and authentication of an agent 102 using a passkey system. The architecture 100 includes a cloud system 104, a public API 106, an authorization server 110, a passkey system 112, and a database 114. In some examples, the authorization server 110 can be connected to a configuration database, omitted from FIG. 1 for simplicity of illustration. The authorization server 110, the passkey system 112, and the database 114 are hosted, in the illustrated example, in the cloud 108, but in some examples, the authorization server 110, the passkey system 112, and the database 114 can be hosted on a single internet server or using a non-cloud-based data center architecture. The architecture 100 can interact with a device 116 belonging to the agent 102 to assist with registering and subsequently authenticating the agent 102 as a user of the cloud system 104. In some examples, one or more components of the architecture 100 can reside on and function on the agent device 116. The passkey system 112 can generally be configured to validate agent and customer identity using a passkey mechanism. The passkey system 112 can be, for example, a standalone microservice. The authorization server 110 can be integrated with the passkey system 112 by configuring the authorization server 110 to redirect an authorization request to the passkey system 112 when a login to the cloud system 104 is by passkey. The passkey system 112 can also be employed in a multicloud architecture.

The agent 102 can interact with a cloud system 104, e.g., via the agent device 116, to initiate a new registration by providing a username and selecting a passkey option. The cloud system 104 can be, for example, a client application that, upon login, provides contact center agents and knowledge workers with tools to manage customer interactions and non-intrusive access to the information, processes, and applications that such agents and workers need to provide customer assistance and otherwise to perform their jobs. The cloud system 104 may provide a cloud login portal, embodied, for example, as a graphical user interface, that enables new registrations for users (including contact center agents) and logins for previously registered users. As examples, the cloud system 104 can be embodied as a web-based form rendered in a web browser, as an app executed on a mobile device, or as a stand-alone executable program run on an operating system such as Microsoft Windows® or Linux®. In some agent passkey registration examples as depicted in FIG. 1, the cloud system 104 can be run on the agent device, e.g., as an Android™ or iOS® app.

The cloud system 104 can transmit the provided username and the passkey registration request to the authorization server 110 via a public API 106, which may be one of several public APIs serving as a primary point of ingress for applications (e.g., RESTful applications) hosted on the cloud 108, including the authorization server 110 and the passkey system 112. The cloud 108 can also host other services and applications omitted from FIG. 1 for simplicity of illustration. The public API may sometimes be referred to as a platform API or common API. Among other functions, the public API 106 can transmit incoming requests to corresponding cloud computing services hosted on the cloud 108. In the example of FIG. 1, public API 106 may recognize the incoming request from the cloud system 104 as a passkey registration request and, thus, forwards the request to the authorization server 110. The authorization server 110 may generally be configured to validate credentials of a user (e.g., agent) and issue access tokens to a client (e.g., cloud system 104) upon successful authentication of the user.

In response to receiving the agent's registration request forwarded from the public API 106 and recognizing that the registration request is a passkey registration request, the authorization server 110 in turn may notify the passkey system 112 of the registration request. The passkey system 112 may respond to the registration request from the authorization server 110 by generating a registration challenge and transmitting the registration challenge to the agent device 116 via a public API 106 (e.g., a web authentication API). The registration challenge can, for example, be a string of randomized bytes. The passkey system 112 may also retain the transmitted registration challenge as an original registration challenge. As examples, the original registration challenge can be temporarily held in memory or stored in the database 114 until a response to the registration challenge is received and the original registration challenge can be compared to the received response. The agent device 116 can be any computing device, which is capable of communication and at least one form of biometric authentication, in the possession of the agent 102 and registered to the agent 102, e.g., a mobile phone, such as a smartphone, or an appropriately equipped laptop or desktop computer. As examples, the agent device 116 can be a smartphone with a fingerprint sensor configured as an authentication mechanism, or a smartphone with a camera and software and/or hardware configured for facial recognition as an authentication mechanism.

In response to receiving the registration challenge, the agent device 116 may collect one or more biometrics from the agent 102 and may generate a public/private key pair and a credential ID. The private key of the key pair may be stored with the domain of the cloud system 104 securely in the agent device 116 and may not be transmitted or shared, except that, in some examples, the private key may be backed up to a another device belonging to the agent 102 or to a cloud account belonging to the agent 102 in accordance with practices accepted as secure. The private key may be securely stored on the agent device 116 in such a way that it can only be subsequently accessed by the provision of a biometric authentication, e.g., a fingerprint or face scan, or some combination of biometrics.

The agent device 116 may cryptographically sign the registration challenge using the private key to create an encoded registration challenge. The agent device 116 may transmit the public key, the credential ID, and the encoded registration challenge as a response to the passkey system 112 via the public API 106. The passkey system 112 may decode the encoded registration challenge using the public key and may compare the resultant decoded registration challenge to the original registration challenge generated by the passkey system 112. Based on the decoded registration challenge matching the original registration challenge, the passkey system 112 may declare the registration challenge to have been validated, indicating that the received public key and credential ID are from the agent device 116, i.e., the device to which the original challenge was addressed, and not from some other device. Based on the registration challenge having been validated, the passkey system 112 can store the credential ID, the username, and the public key in the database 114, and can notify the authorization server 110 of the new registration. The database 114 can be, for example, a NoSQL (non-relational) database. The registration challenge need not be stored in the database 114 and can, at this point, be discarded from the database 114 if previously stored while awaiting the response. The authorization server 110 can communicate the successful registration to the cloud system 104, which can notify the agent 102 that the agent registration is complete. In some examples, the cloud system 104 may leave the agent 102 logged into the cloud system 104 after a successful registration.

After registration, during a subsequent authentication of the agent 102 ("agent login"), the agent may provide a username to the cloud system 104 and may indicate that the login will be by passkey. The login request may be sent by the cloud system 104 to the authorization server 110 via a public API 106. The authorization server 110, noting that the login is by passkey, may forward the login request to the passkey system 112. The passkey system 112 may generate a login challenge and may transmit the generated login challenge to agent device 116, which may act as the authenticator. The login challenge can be a string of randomized bytes. The passkey system 112 may also retain the login challenge as an original login challenge, temporarily storing the original login challenge either in memory or in the database 114 while awaiting a response from the agent device 116. The agent device 116 may prompt the agent 102 to provide one or more biometrics, which the agent device 116 may compare with the earlier-collected one or more biometrics to confirm the agent's identity.

In response to determining that the newly provided one or more biometrics are a match for the earlier-collected one or more biometrics, the agent device 116 may retrieve the earlier-stored private key for the requested domain and may sign the received login challenge with the retrieved private key to generate an encoded login challenge. The agent device 116 may then send the encoded login challenge as a response to the passkey system 112 via the public API 106. The passkey system 112 may retrieve the earlier-stored public key for the agent 102 from the database 114 and may decode the encoded login challenge with the retrieved public key. Based on the decoded login challenge matching the original login challenge, the passkey system 112 may declare the login challenge to have been validated, indicating that the received response is from the agent device 116, i.e., the device holding the private key that forms the key pair with the public key stored in the database 114. The login challenge need not be stored in the database 114 and can, at this point, be discarded from the database 114 if previously stored while awaiting the response.

Based on the login challenge having been validated, the passkey system 112 may communicate the successful authentication of the agent 102 to the authorization server 110. The authorization server 110 may communicate the successful registration to the cloud system 104, which may notify the agent 102 that the agent is logged in. For example, the cloud system 104 can switch from displaying the login portal to displaying a dashboard, control panel, or other user interface only visible to logged-in users, and which, in some examples, may be customized for the particular agent 102. Architecture 100 thus illustrates how the inclusion of the passkey system 112 into the set of services provided by the cloud 108 provides an option to use passkeys instead of passwords for agent authentication.

Figure 2:
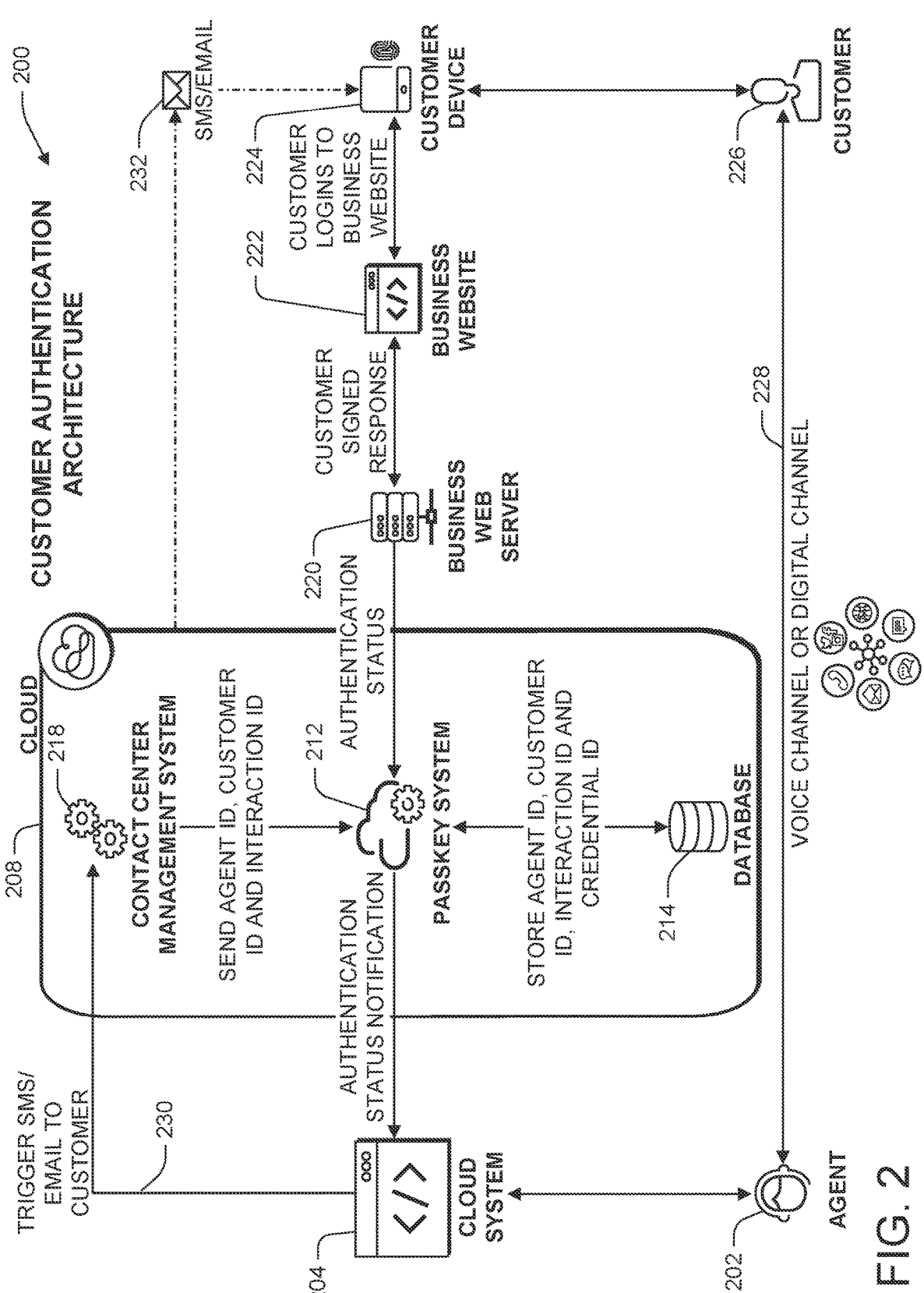
FIG. 2 is a block diagram of an example contact center system for user authentication.

FIG. 2 illustrates an example architecture 200 for authentication of a customer 226, by an agent 202, using a passkey system. A customer 226 may sometimes be referred to as a user. The authentication can happen, for example, while the customer 226 is engaged in a call or other form of communication with a contact center (an "interaction"). The architecture 200 includes a cloud system 204, a passkey system 212, a database 214, and contact center management system 218. The passkey system 212, the database 214, and the contact center management system 218 are hosted, in the illustrated example, in the cloud 208, but in some examples, the passkey system 212, the database 214, and the contact center management system 218 can be hosted on a single internet server or using a non-cloud-based data center architecture. The architecture 200 can interact with a business web server 220, a business website 222, and a device 224 belonging to the customer 226 to assist with authenticating the customer 226 to the agent 202 as a user of the business website 222 hosted on the business web server 220.

As an example, the business web server 220 and business website 222 may belong to, or be managed or controlled by, a business that has contracted with a third-party provider of contact center services, and it is this third-party provider that has, in turn, supplied the services of the agent 202. The third-party provider of contact center services may use the cloud system 204 and the cloud-based contact center management system 218 to facilitate its provision of contact center services. The business web server 220 can be a web server, deployed by the business in the business's preferred production environment, and configured to serve the business's customer-facing website(s), including business website 222. The business website 222 can be a customer-facing website developed by the business to provide the business's digital services to the customer 226. The business website 222 can be accessed using the customer device 224, which can be a physical device (e.g., smartphone, laptop computer, desktop computer) controlled by the customer 226 and used for registering a user account on the business website 222. From the perspective of the customer 226, the agent 202 may represent the business that owns, manages, and/or operates the business website 222. As examples, the business may be a bank or other financial institution, a retailer, or some other provider of goods or services.

In some examples, one or more components of the architecture 200 can reside on and function on the business web server 220, the business website 222, and/or the customer device 224. The agent 202 can use the cloud system 204, to which the agent 202 may have logged in using a passkey-based architecture like architecture 100 of FIG. 1, to access tools used to manage the interaction with the customer 226 and other customers. As examples, the cloud system 204 may be used to initiate or terminate contact with the customer 226, place a voice call with the customer 226 on hold, merge voice calls to conference in multiple lines, or other functions.

In some examples, the same elements used to handle agent registration and authentication can also be used for customer authentication. That is, elements of the example architecture 200 can, in some examples, be the same as the similarly named elements of the agent registration and authentication architecture 100 of FIG. 1. For example, the cloud system 204 used by the agent 202 in the architecture 200 of FIG. 2 can be the same as the cloud system 104 used by the agent 102 in the architecture 100 of FIG. 1. As another example, the passkey system 212 and database 214 of the cloud 208 in the architecture 200 of FIG. 2 can each respectively be the same as the passkey system 112 and database 114 of the cloud 108 in the architecture 100 of FIG. 1. In other examples, a different database 214 can be used for storing customer-related authentication information than the database 114 used for storing agent-related authentication information, for example.

The contact center management system 218 can, in some examples, include a drag-and-drop web-based design tool that creates flows for media types, which can be used to design workflows based on business needs. For example, the web-based design tool of the contact center management system 218 can be used to design a workflow that sends an electronic message (e.g., an SMS text message or an email message) containing a verification link to a customer device 224. The verification link can be, for example, a secure hypertext transfer protocol (HTTPS) link. The workflow can also share an agent ID (identifying agent 202), a customer ID (identifying customer 226), and an interaction ID (identifying the particular interaction between agent 202 and customer 226) to the passkey system 212. As an example, the contact center management system 218 can be Architect by Genesys Cloud Services, Inc.

In the context of the example architecture 200 for authenticating the customer 226 to the agent 202, the customer 226 can have already registered with the business website 222 to obtain a passkey-based authentication credential that the customer uses to login to the business website 222. Similar to the agent device 116 of FIG. 1, the customer device 224 of FIG. 2 can be any computing device, capable of mobile communication and at least one form of biometric authentication, in the possession of the customer 226 and registered to the customer 226, e.g., a mobile phone, such as a smartphone, or an appropriately equipped laptop or desktop computer. As examples, the customer device 224 can be a smartphone with a fingerprint sensor configured as an authentication mechanism, or a smartphone with a camera and software and/or hardware configured for facial recognition as an authentication mechanism. An example of such facial recognition software and/or hardware is the Face ID® facial recognition system by Apple Inc. In some examples, the customer 226 can access the business website 222 on the customer device 224 using, for example, a web browser on the customer device 224 or an app published by the business and installed on the customer device 224. In other examples, the customer 226 can access the business website 222 using another device (e.g., a desktop PC) but authenticate the login via the other device using the customer device 224 that includes biometric authentication features.

The customer 226 may contact the agent 202 over a voice or digital channel 228 to solicit the assistance of the agent 202. Examples of voice channels may include telephone calls made over mobile phones or landlines. Examples of digital channels may include email communications, chat using a web application (e.g., a chat function of the business website 222), chat using short message service (SMS) text messages (e.g., sent and received using customer deice 224), chat using a social media service such as Twitter®, Facebook®, or Instagram®, a video call using a video call or videoconferencing service or social media service, or any combination of the above. Examples of assistance that the customer 226 may solicit from the agent 202 may be help with ordering one or more items for purchase, help with canceling all or part of a purchase order, help with redirecting delivery of one or more ordered items, help with returning purchased items, help with making a financial transaction, help with opening, closing, or temporarily disabling an account (e.g., a credit card account or a bank account), help with setting up, troubleshooting, or canceling a service (e.g., internet service, cable TV service, streaming video service), help with canceling transactions detected as or suspected to be fraudulent, help with applying for a line of credit or a loan, and so forth.

Based on the customer 226 not already being authenticated with the business web server 220, the agent 202 may ask the customer 226 to prove the customer's identity with a passkey generated to access the business website 222. The agent 202 may do so by using the cloud system 204 to send a trigger signal 230 to the contact center management system 218. In response to receiving the trigger signal 230, the contact center management system 218 can prompt the customer 226 to authenticate by passkey, and the way in which the contact center management system 218 transmits the prompt to the customer 226 can be based on the type of channel 228 by which the customer 226 and the agent 202 are interacting. For example, based on the channel 228 being a voice channel, the contact center management system 218 can initiate the sending of an electronic message 232 (e.g., an SMS text message or an email message) containing a verification link from the cloud 208 or other services host to the customer device 224. The verification link can be activated manually (by the customer 226 in interaction with the customer device 224) or automatically (by the customer device 224 without input from the customer 226). The activation of the verification link can, as examples, open the business website 222 in a web browser run on the customer device 224, or open a smartphone app installed on the customer device 224 that displays the business website 222 or a functional equivalent of the business website 222, which, for the sake of simplicity, will also be referred to as the business website 222. For example, a login portal of the business website 222 may be displayed in the web browser or app, which prompts the customer 226 to login using a passkey authentication method. The business website 222 can then authenticate the customer 226 using a passkey, for example, by using a JavaScript application embedded in the business website 222.

To the customer 226, the passkey authentication may appear as a relatively frictionless set of prompts to be chosen, e.g., a first prompt to autofill a username, a second prompt to choose passkey as an authentication method, and a third prompt to perform a biometric check. In some examples, the third prompt may be unnecessary, as where the customer device may perform the biometric check automatically, e.g., where the biometric check is based on a facial recognition. The business web server 220 may send a login challenge to the customer device 224. The customer device 224 may then sign and return the login challenge using a private key stored on the customer device 224 and accessed via the biometric check, in a similar fashion as described above with regard to the passkey-based agent registration and login architecture 100 of FIG. 1. The business web server 220 may decode the response from the customer device 224 (the signed, encrypted login challenge) using a public key of the customer's passkey stored on the business web server 220 and can compare the decoded login challenge to the original login challenge maintained on the business web server 220 to authenticate the customer 226. The business web server 220 may then report the status of the customer's passkey authentication to the business website 222 and to the passkey system 212 in the cloud 208. The business web server 220 may communicate the authentication status to the passkey system 212 using one or more public APIs (not shown in FIG. 2). Many of the above-described aspects of the login may be invisible to the customer 226, who may see only an authentication success notification (e.g., as a brief pop-up notification displayed on the customer device 224) indicating successful login substantially immediately after the biometric is provided to the customer device 224, with any delay being attributable to information transmission latency between the customer device 224 and the business web server 220 (e.g., over the internet) and processing time (including, e.g., cryptographic processing time to decode and compare the response) at the business web server 220.

Upon receiving the status of the customer's passkey authentication from the business web server 220, the passkey system 212 can transmit an authentication status notification to the cloud system 204 to notify the corresponding agent 202 in interaction with the customer 226, via the cloud system 204, that the customer 226 has been successfully authenticated to the business web server 220 using a passkey credential. The authentication status notification transmitted from the passkey system 212 to the cloud system 204 accordingly can include at least a customer ID of the customer 226. The authentication status notification may, in some examples, further include an agent ID of the agent 202, an interaction ID for the interaction between the agent 202 and the customer 226, and/or a credential ID. The transmission from the passkey system 212 to the cloud system 204 may be via a public API (not shown in FIG. 2).

Thus, the passkey-based registration and authentication of the customer 226 can be handled by the business web server 220 and business website 222, and the passkey system 212 in customer authentication architecture 200 can share the customer authentication status received from the business web server 220 to the contact center agent 202 via the cloud system 204. In order to direct the customer authentication status to the correct agent 202 (as opposed to another agent logged into a different respective instance of the cloud system 204), the passkey system 212 may obtain the agent ID, customer ID, and/or interaction ID from the contact center management system 218. The passkey system 212 can also store the obtained agent ID, customer ID, and/or interaction ID in its database 214.

As noted above, the customer passkey authentication prompt issued by the contact center management system 218 can be issued in a way that can be based on the type of channel 228 by which the customer 226 and the agent 202 are interacting. The above description relates to an electronic message prompt (e.g., sent to customer device 224 by SMS or email) used when the channel 228 is a voice channel. In other examples, customer 226 may interact with the agent 202 via the business website 222, e.g., using a text-based chat interface provided on the business website 222, or using a voice or video chat interface provided through the business website 222. In the context of such examples, the customer 226 can have already authenticated, by passkey, to the business website 222 during a login procedure, and thus the passkey system 212 will already have been apprised of the positive authentication status of the customer 226. However, based on the customer's login to the business website 222 not being by passkey, or based on re-authentication being desired by the agent 202 to ensure security, the agent 202 may ask the customer 226 to logout of the business website 222 and re-authenticate to the business website 222 by passkey, with the result that the authentication status is again reported to the passkey system 212 by the business web server 220 and subsequently to the cloud system 204 in a form viewable by the agent 202.

In other examples, the customer 226 may interact with the agent 202 by a text-based chat, a voice chat, or a video chat through a social media network. In still other examples, the customer 226 may interact with the agent by email or SMS messaging. In any example in which the customer 226 uses a communication channel 228 other than one provided by the business website 222, such that the customer 226 is not already logged into the business website 222 by passkey at the time of the contact center interaction, the customer 226 can be shared a verification link from the agent 202 through the corresponding digital channel 228 (e.g., chat, SMS, or email). The verification link can function as described above with respect to voice-channel-based customer authentication. The customer 226 can activate the verification link and confirm identity by signing in to the business website 222 (or, for example, a corresponding smartphone app) using passkey authentication. As described above, the business web server 220 can subsequently share a customer authentication status indicating that the identity of the customer 226 has been verified to the passkey system 212, which in turn can inform the agent 202 of the customer authentication status via the cloud system 204.

Figure 3B:
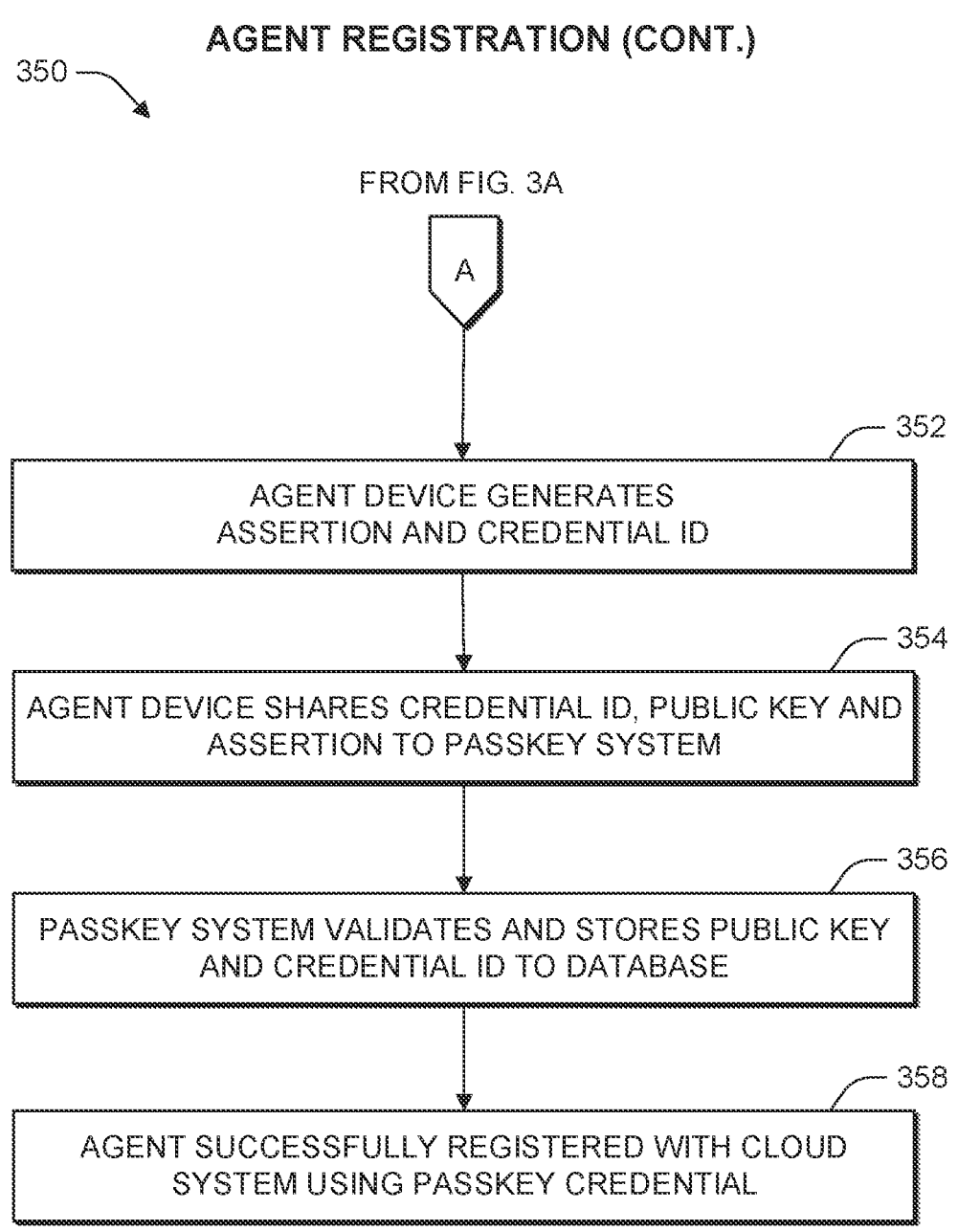

FIGS. 3A and 3B illustrate an example method 300, 350 of contact center agent registration with a cloud system to obtain a passkey credential for the cloud system. The method can, for example, use an architecture like architecture 100 shown in FIG. 1. The cloud system can be, for example, cloud system 104 in FIG. 1. In an embodiment, the agent tries 302 to register for a passkey to the cloud system, e.g., by navigating to a login portal of the cloud system from an agent device. The agent device can be, for example, agent device 116 in FIG. 1. Whatever the form of the agent device, smartphone or otherwise, the agent device is at least capable of data communication, of biometric authentication, and of storing a private key in a location accessible only by biometric authentication.

The login portal may prompt the agent to enter a unique username into the login portal. For example, the login portal can consist of a graphical user interface with a fillable username field and a submit button that can be labeled "Register for passkey" or similar. Not shown in FIG. 3A, in some examples, the login portal can warn the agent, e.g., with a dynamic text warning or pop-up message, when an entered username is not unique before permitting the registration process to proceed. The cloud login portal may then ask 304 the agent device to generate a new passkey, e.g., by sending a passkey generation request to the agent device. As described above, the generated passkey consists of a key pair, with the private key of the key pair being securely stored in the device such that it is only accessible via biometric authentication. At this point, the agent device may return a signal to a cloud server hosting the login portal indicating whether it will or will not generate the passkey. For example, an agent device may not be properly equipped with biometric authentication or may detect that its biometric authentication is broken or tampered with. In such a case, the agent device may respond to the passkey system that no passkey will be generated. On the other hand, the agent device may respond that it is capable of generating a passkey. Based on the agent device declining to generate a passkey, the login portal may direct 306 the agent to other registration options, including, in some examples, registration using a password, e.g., with two-factor authentication.

Based on the agent device indicating to the cloud server hosting the login portal the agent device's ability to generate a passkey, a passkey system hosted on the cloud may generate and send 308 a registration challenge to the agent device. The passkey system may be, for example, passkey system 112 of FIG. 1. The challenge can be a string of randomized bytes. Along with the registration challenge, in some examples, the passkey system may also send to the agent device user and relying party information. The agent device may then generate 310 a public/private key pair by authorizing through the agent's biometric data, such as a fingerprint or facial recognition. Based on the agent not providing adequate biometric data, or the biometric data otherwise not being adequately collected by the agent device, the passkey registration may fail 312, and the agent may be redirected back to the cloud login portal, which may, at this point, display an appropriate error message (e.g., "Passkey registration failed: biometric not recognized," or similar).

Based on the biometric being adequately provided and collected, the agent device can store 314 the biometric and the generated private key in a secure location on the agent device. In some examples, the private key may be stored in another secure location, such as within a cloud-based file storage that is similarly only accessible by providing a biometric that matches the collected biometric.

With reference to FIG. 3B, the method 300 can continue as method 350. The agent device generates 352 an assertion (the registration challenge encoded using the private key) and a credential ID and sends 354 the credential ID, the public key, and the assertion to the passkey system. The passkey system validates 356 the assertion by decoding it with the public key and checking that the decoded assertion is identical to the registration credential earlier generated by the passkey system, and, upon successful validation, stores the public key and the credential ID to a database. The database can be, for example, database 114 in FIG. 1. At this point, the agent is successfully registered 358 with the cloud system using a passkey credential. The cloud system can, at this point, leave the agent as logged in to the cloud system.

Figure 4A:
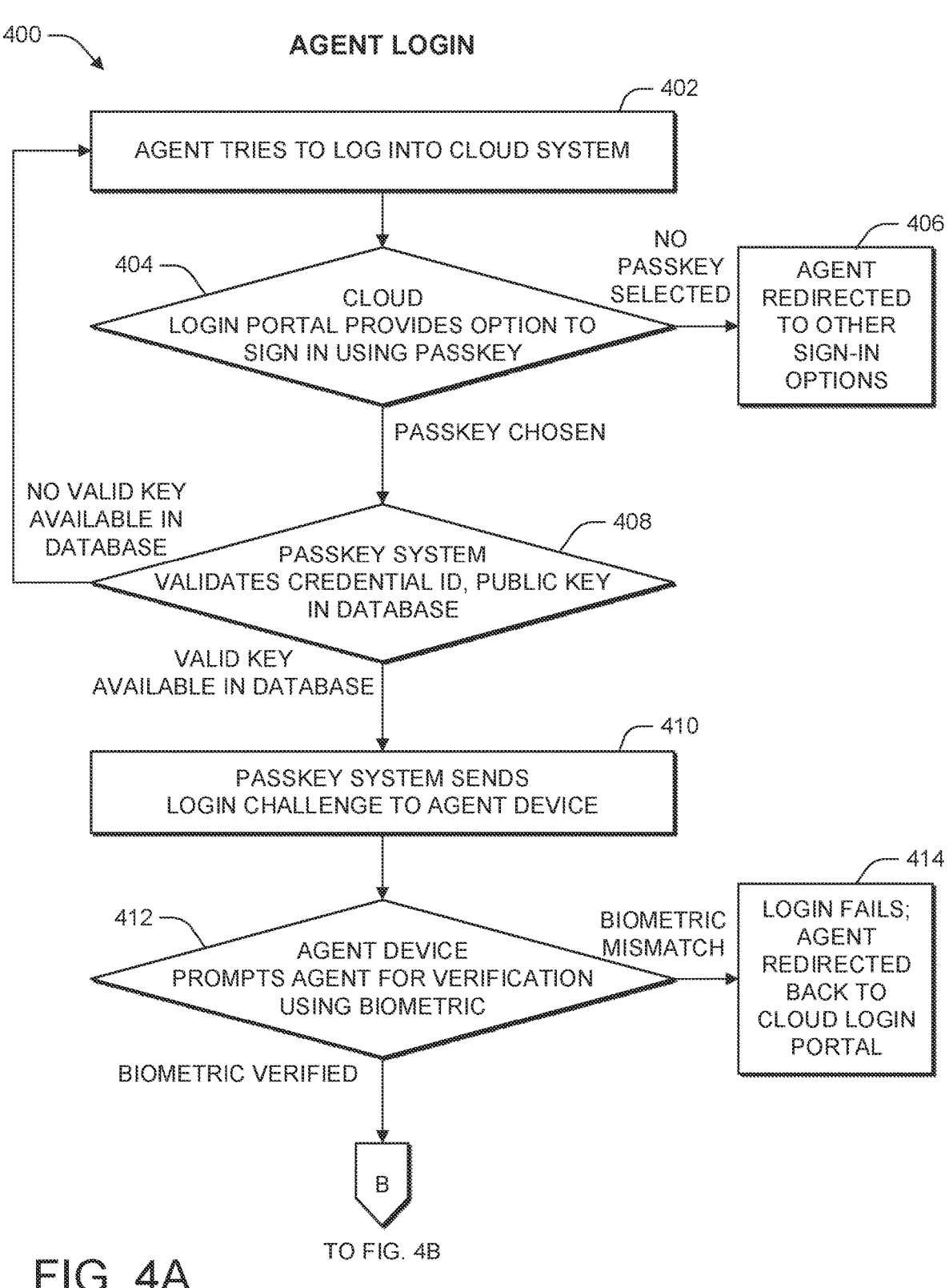
FIGS. 4A and 4B are a flow diagram of an example method for agent login using passkeys.
Figure 4B:
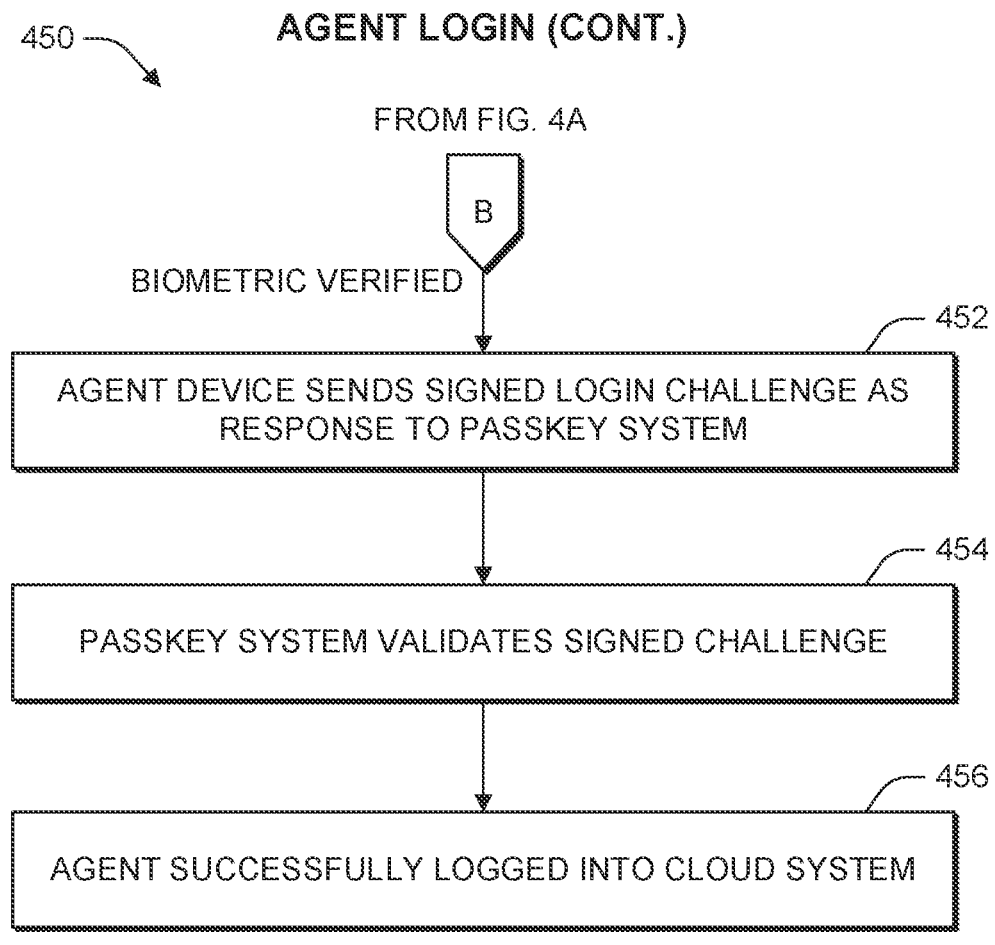

FIGS. 4A and 4B illustrate an example method 400, 450 of contact center agent authentication to a cloud system using an earlier registered passkey credential for the cloud system. For example, the passkey credential can have been earlier registered using the method 300, 350 of FIGS. 3A and 3B. An agent may try 402 to log into a cloud system, e.g., using a login portal of the cloud system. For example, the agent may enter a username, either by manually keying in the username or by choosing the username as a stored username or allowing a browser to autofill the username from a stored username. The cloud system can be, for example, the cloud system 104 of FIG. 1. The login portal can provide 404 an option to sign in using a passkey. The login portal can, in some examples, provide a failover option in case passkey login is declined or fails. The failover option can include, for example, a password login option, e.g., using two-factor authentication.

Based on the agent not selecting passkey login from the login portal, the login portal can redirect 406 the agent to other sign-in options. Based on the agent choosing the passkey login method, a passkey system (e.g., passkey system 112 in FIG. 1) can determine 408 that a valid credential ID and public key are stored in an associated database (e.g., database 114 in FIG. 1) as corresponding to the entered username. Based on there being no matching credential ID or no valid public key available in the database, the agent can be returned 402 to the beginning of the login portal or, in some examples, redirected 406 to other sign-in options. Based on the credential ID and public key being available in the database, the passkey system can generate a login challenge and send 410 the login challenge to an agent device (e.g., agent device 116 of FIG. 1). The login challenge can be a string of randomized bytes. The agent device can be any computing device capable of communication, equipped with biometric authentication features, and configured to store a private key of the passkey in a secured location that is accessible only by biometric authentication. Having received the login challenge, the agent device can prompt 412 the agent for verification using at least one biometric. Based on the agent not providing a biometric or a provided biometric not matching a biometric earlier collected (e.g., during a passkey registration process), the login fails 414 and the agent can be redirected back to the cloud login portal.

With reference to FIG. 4B showing the continuation of method 400 as method 450, based on the provided biometric being verified as a match for the earlier-collected biometric, the agent device can sign the login challenge using the retrieved private key and send 452 the signed login challenge as a response to the passkey system. The passkey system can validate 454 the signed login challenge by decoding the signed login challenge using the public key earlier stored in the database and associated with the credential ID corresponding to the entered username, and comparing the decoded login challenge with the login challenge earlier generated by the passkey system. Based on the decoded login challenge matching the earlier-generated login challenge, the passkey system can determine 456 that the agent has successfully logged into the cloud system and can notify, e.g., an authentication server as may be appropriate to grant the agent access to the cloud system. Accordingly, the contact center agent's login experience is made relatively frictionless by the method 400, 450 because the agent only needs to enter a username and provide a biometric to login to the cloud system.

Figure 5B:
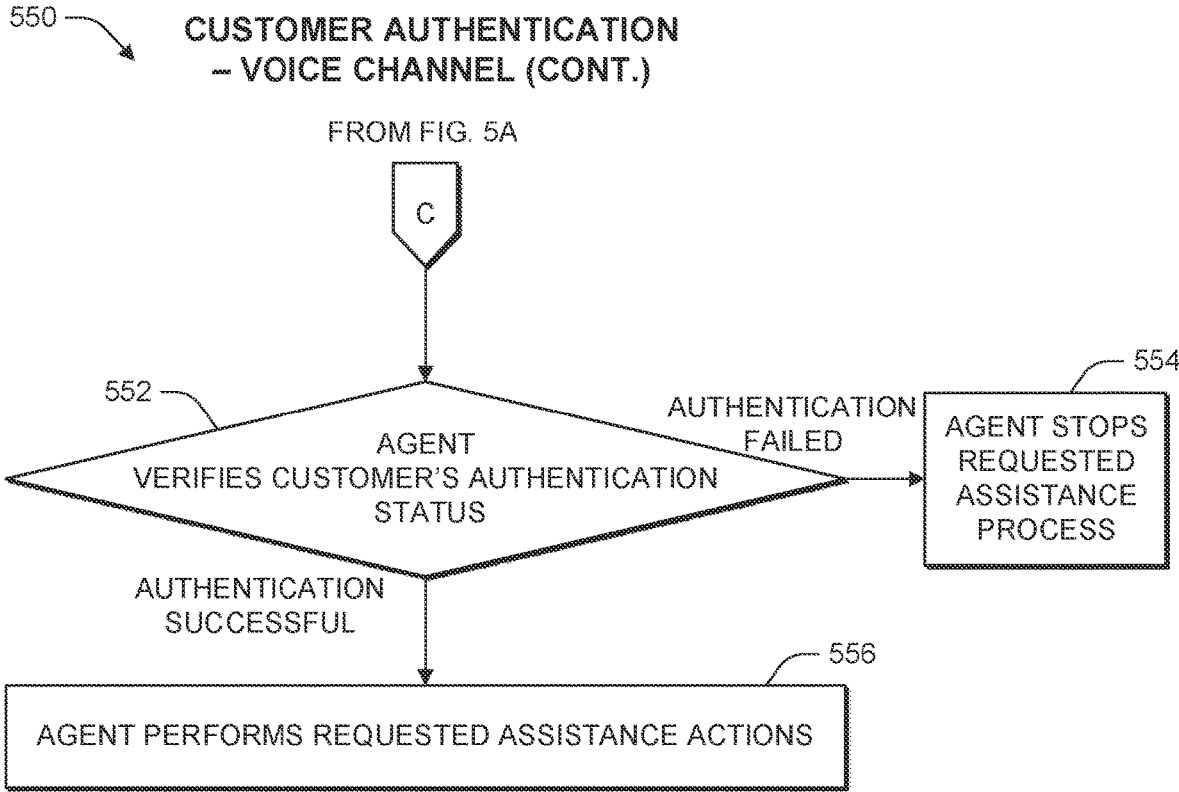

FIGS. 5A and 5B illustrate an example method 500, 550 of customer authentication using a passkey during an inbound voice call to a contact center. A customer with passkey registration enabled may call 502 a contact center for assistance. As one example, the customer may be a bank customer, and through a voice call to the bank's contact center, seeks assistance in blocking the customer's credit card after noting suspicious activity on the customer's credit card account. If the customer is already registered to the bank service using a passkey, the contact center agent does not need to obtain the customer's personal information like credit card number or customer ID from the customer over the voice call. Instead, the agent can send 504 a link to a passkey-registered customer device (e.g., customer device 224 in FIG. 2) to verify the identity of the customer. The link can be sent via a communication mechanism appropriate to the voice channel over which the agent and the customer interact. For example, the link can be sent by an SMS text message or an email message (e.g., message 232 in FIG. 2) that the customer can open on the customer device.

The customer can open 506 the link in the passkey-registered customer device, which accesses a business website (e.g., business website 222 in FIG. 2) or app with a login portal. In the example that the customer is a bank customer, the business website can be a website of the bank. Once the customer opens 506 the link on the passkey-registered customer device, the customer's username can be autosuggested in the login portal. Via the login portal, the customer can authenticate 508 using the passkey and biometrics. The customer can be prompted by the customer device to provide at least one biometric to verify that the customer performing the authentication is the registered customer. The passkey authentication can be handled by a business web server (e.g., business web server 220 in FIG. 2), which can send a login challenge to the customer device for signing using the private key of the passkey securely stored on the customer device. In the example that the customer is a bank customer, the business web server can be a web server that hosts the bank's website. Once the customer identity is verified 508 by biometric, the customer device can send a signed response to the business web server, where the customer's passkey is validated by decoding the signed response with a public key stored in a database of the business webserver and then comparing the decoded response with the login challenge. After successful validation, the web server can send the authentication status to a passkey system (e.g., using an embedded JavaScript application running in the website). The passkey system can run in the cloud and can be, for example, passkey system 212 in FIG. 2.

A contact center management system (e.g., contact center management system 218 in cloud 208 in FIG. 2) can provide a workflow that sends information such as agent ID, customer ID, and interaction ID to the passkey system, which in turn can store this information in a database (e.g., database 214 in FIG. 2, which can, for example, be a NoSQL database). The passkey system can notify 510 the appropriate agent (as determined by the agent ID and/or the interaction ID stored in the database) of the authentication status as notified by the business web server.

With reference to FIG. 5B showing the continuation of method 500 as method 550, the agent can then verify (e.g., by reference to a cloud system, such as cloud system 204 in FIG. 2, to which the agent is securely logged in) the authentication status and, based on this verification, can proceed to assist 556 the customer, e.g., with the requested credit card blocking process in the bank service example. Alternatively, based on the agent determining that the passkey-based authentication of the customer was not successful, the agent can refuse 554 the requested assistance, or, in some examples, can rely on less secure conventional authentication procedures to verify the identity of the customer, depending on the circumstances and the particular protocols to be followed by the contact center agent.

An example transcript of a customer-agent interaction (voice conversation), in which the customer is authenticated via passkey in accordance with the method 500, 550, is given below. The customer contacts the Example Bank contact center through a voice channel.

Agent (John): Hi Thomas, this is John from Example Bank Support. How can I help you?

Thomas: Hey, John. I have been notified of suspicious activity on my credit card. Could you please help me with that?

Agent (John): Can you please explain what kind of suspicious activities you have been notified of?

Thomas: I have been notified of some recent transactions made today that I am sure weren't made by me.

Agent (John): Don't worry. We will help you block that credit card. I can see that you have registered using passkeys. I will send you a link to your registered device to prove your identity.

Thomas: Of course. Could you please explain the procedure?

Agent (John): Sure. I will walk you through each step. First you need to open the link in your registered device.

At this point, the agent, John, triggers the delivery of an SMS text message that contains a verification link to the customer device. A passkey system fetches some information like agent ID, customer ID and interaction ID and stores it in a database.

Thomas: The registered device is the one I'm using right now. Let me open the link.

At this point, the customer, Thomas, opens the authentication link in the registered device, which opens the business website, in this case the website of Example Bank.

Thomas: Done. It's now asking for my credentials.

Agent (John): Great. Now if you already registered to our site using passkey, your username and passkey will be autosuggested. Please click on your credentials and then click "Sign in."

At this point in the interaction, Thomas's customer device verifies the domain and checks for the passkey in the secured location.

Thomas: Yes. My username has been autosuggested.

The customer clicks on his autosuggested passkey credentials and clicks "Sign in."

Thomas: Done. Selected my passkey credentials and clicked "Sign In".

Agent (John): Now you will be prompted for your biometric verification to check that you are the one authenticating. Please proceed with that.

The customer, Thomas, verifies his biometric and then signs in. The customer device sends a signed response to the Example Bank web server that validates the customer private key. The Example Bank web server then sends the authorization status to the passkey system using an embedded JavaScript application that runs in the customer website. The passkey system then notifies the agent about the authenticity of the customer.

Agent (John): Thanks, Thomas. Your identity has been verified. I have initiated the process to block your credit card. Anything else?

Thomas: Wow! That was smooth and seamless. You didn't even need any other details like my card number or PIN. Thanks so much for your help, John.

Agent (John): Thanks for giving me an opportunity to assist you today.

This concludes the voice channel contact center interaction.

Figure 6A:
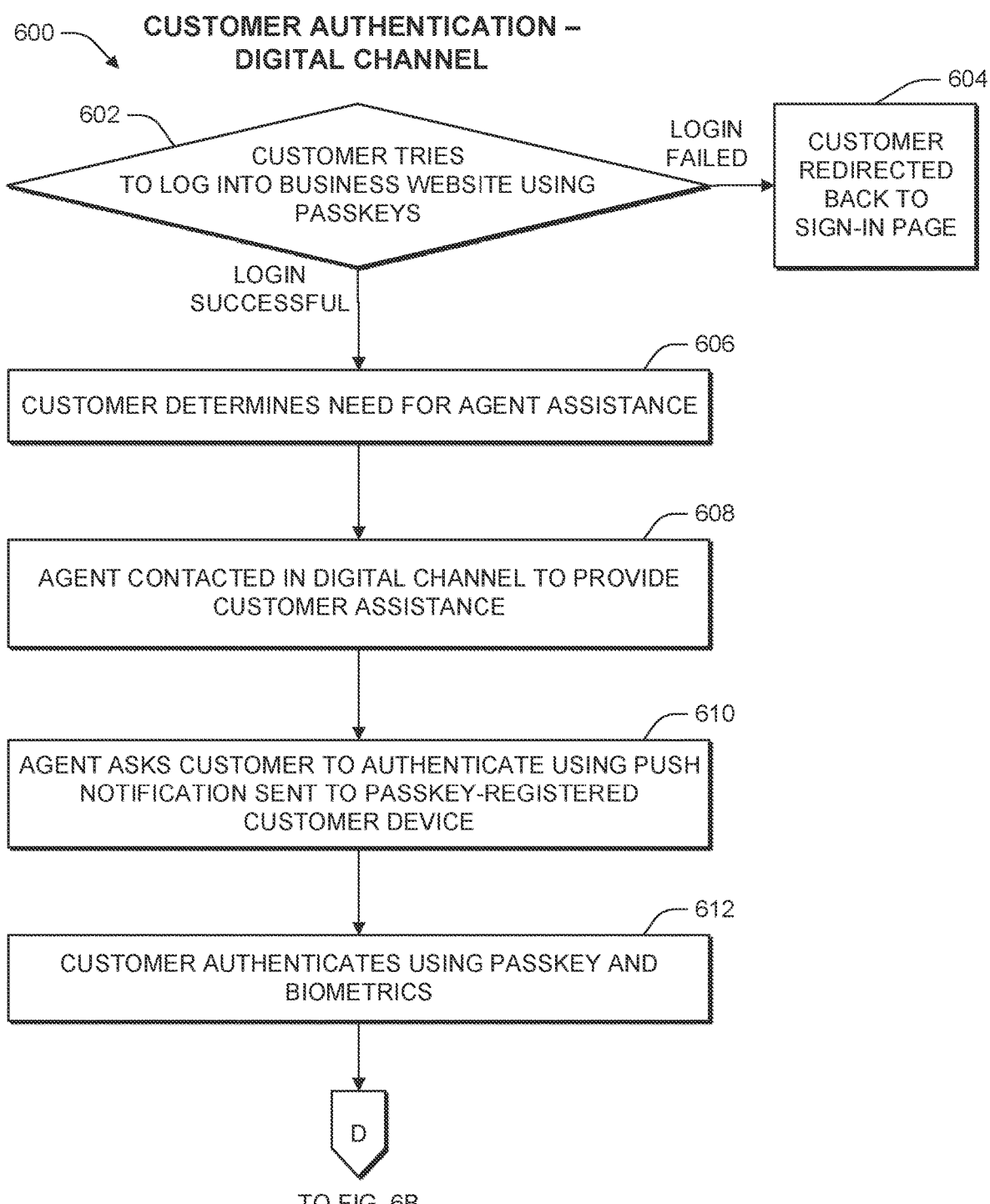

FIGS. 6A and 6B illustrate an example method 600, 650 of customer authentication using a passkey during a customer interaction with a contact center agent over a digital channel, e.g., a digital channel outside of one provided by the business website. The digital channel can be, for example, an SMS text message or an email message thread, an instant message or direct message thread over a social network, or another form of communication not involving a voice call to the contact center. The agent can be a human agent or, in some examples, can be a chatbot. The customer may try 602 to log into the business website (e.g., business website 222 in FIG. 2) hosted on the business web server (e.g., business web server 220 in FIG. 2) using passkeys. Based on the customer's login failing, the customer may be redirected 604 back to a sign-in page. Based on the customer's login being successful, the customer may determine 606 a need for agent assistance. For example, the customer may examine records on the business website (e.g., bank records, or sales records) and find an indication of a problem that requires agent intervention. For example, if the customer is a bank customer and the business website is a bank website, the customer may look at an account statement on the business website and decide to cancel a pending transaction. The customer may open a chat widget on the website, or may contact the business through another communication channel offered by the business, e.g., on a social media account owned by the business. The customer can thereby contact 608 an agent in a digital channel to receive customer assistance.

At some point in the interaction, based on the communication channel being through the business web server (e.g., using the chat widget available on the business website), it will be clear to the agent that the customer has already been authenticated by passkey, as the authentication may appear, for example, on the agent's cloud system (e.g., cloud system 204 in FIG. 2). In such a case, no further authentication of the customer may be necessary. Based on the communication channel not being through the business web server, but instead through, for example, SMS, email, or a social media account, the agent may ask 610 the customer to authenticate using a push notification sent to a passkey-registered customer device (e.g., customer device 224 in FIG. 2). The customer can then authenticate 612 using a passkey and biometrics, as described above. The push notification can, in some examples, take a different form when the customer-agent interaction is over a digital channel, as compared to when the customer-agent interaction is over a voice channel. For example, whereas an SMS text message or an email message may be used to send a verification link when a voice channel is used for the customer-agent interaction, the push notification can instead, for example, trigger a client-side application (e.g., a JavaScript application) running on the business website. This client-side application can ask the customer to perform a passkey-based validation, e.g., by a pop-up message.

With reference to FIG. 6B, showing the continuation of method 600 as method 650, the customer having successfully authenticated using passkey, the customer authentication status can be shared 652 by the business website to a passkey system (e.g., passkey system 212 in FIG. 2). The agent may then check 654 the customer authentication status from the passkey system. For example, if the agent is a human agent, the agent may verify the customer authentication status by noting it on the cloud system to which the agent has been securely authenticated and to which the customer authentication status has been reported by the passkey system. Otherwise, if the agent is a chatbot, the agent may be programmatically provided with the customer authentication status. Based on the agent noting that the customer authentication has failed, the agent can refuse 656 the requested assistance or, in some examples, can rely on less secure conventional authentication procedures to verify the identity of the customer, depending on the circumstances and the particular protocols to be followed by the contact center agent. Based on the agent noting that the customer authentication by passkey was successful, the agent may proceed to perform 658 the requested customer assistance actions with confidence that the customer seeking assistance is not a bad-actor impersonator.

An example transcript of a customer-agent interaction (text-based chat), in which the customer is authenticated via passkey in accordance with the method 600, 650, is given below. The customer, Robert, who has already registered a passkey credential with the Example Bank website and logged into the Example Bank website by passkey, looks at a listing of transactions related to the customer's account, notices a transaction alert, and decides to cancel a pending transaction. The customer contacts the Example Bank contact center through a digital channel. A chatbot is placed online to aid the customer. The chatbot may proactively initiate the communication. The customer requests the chatbot (Kate) to cancel the pending transaction against his/her account. During this process, the chatbot asks the customer to authenticate himself using a passkey along with a biometric by sending a push notification to the customer's passkey-registered device. The customer proceeds to authenticate himself using the passkey generated for The Example Bank domain. The authentication status of the customer is then shared by the Example Bank website. A JavaScript application running inside the Example Bank website then shares the authentication status of the customer to the passkey system. The chatbot ensures the successful authentication from the passkey system and proceeds to cancel the transaction.

Kate: Hello, Robert. Good morning.

Kate: How can I help you?

Robert: I was shown a pending transaction in my statement

Kate: I can see a pending transaction for $250 in your account.

Kate: Would you like to complete the transaction?

Robert: When was that transaction made?

Kate: It was performed on Jan. 31, 2023 to Online Retailer X.

Robert: Oh, I got it. Could you cancel that transaction?

Kate: Sure, I can help you with canceling that transaction.

Kate: Could you please authenticate yourself by opening the push notification sent to your registered device?

At this point in the customer service interaction, the customer, Robert, opens the push notification from his passkey-registered device and authenticates himself to the Example Bank website using his passkey. The authentication status is shared by a client-side application (e.g., a JavaScript application) in the Example Bank website to the passkey system. Kate, the chatbot, verifies the authentication status with the passkey system.

Kate: Thank you for confirming your identity. You are successfully authenticated.

Kate: Your transaction for $250 on Jan. 31, 2023 to Online Retailer X has been canceled successfully.

This concludes the digital channel contact center interaction.

Figure 7:
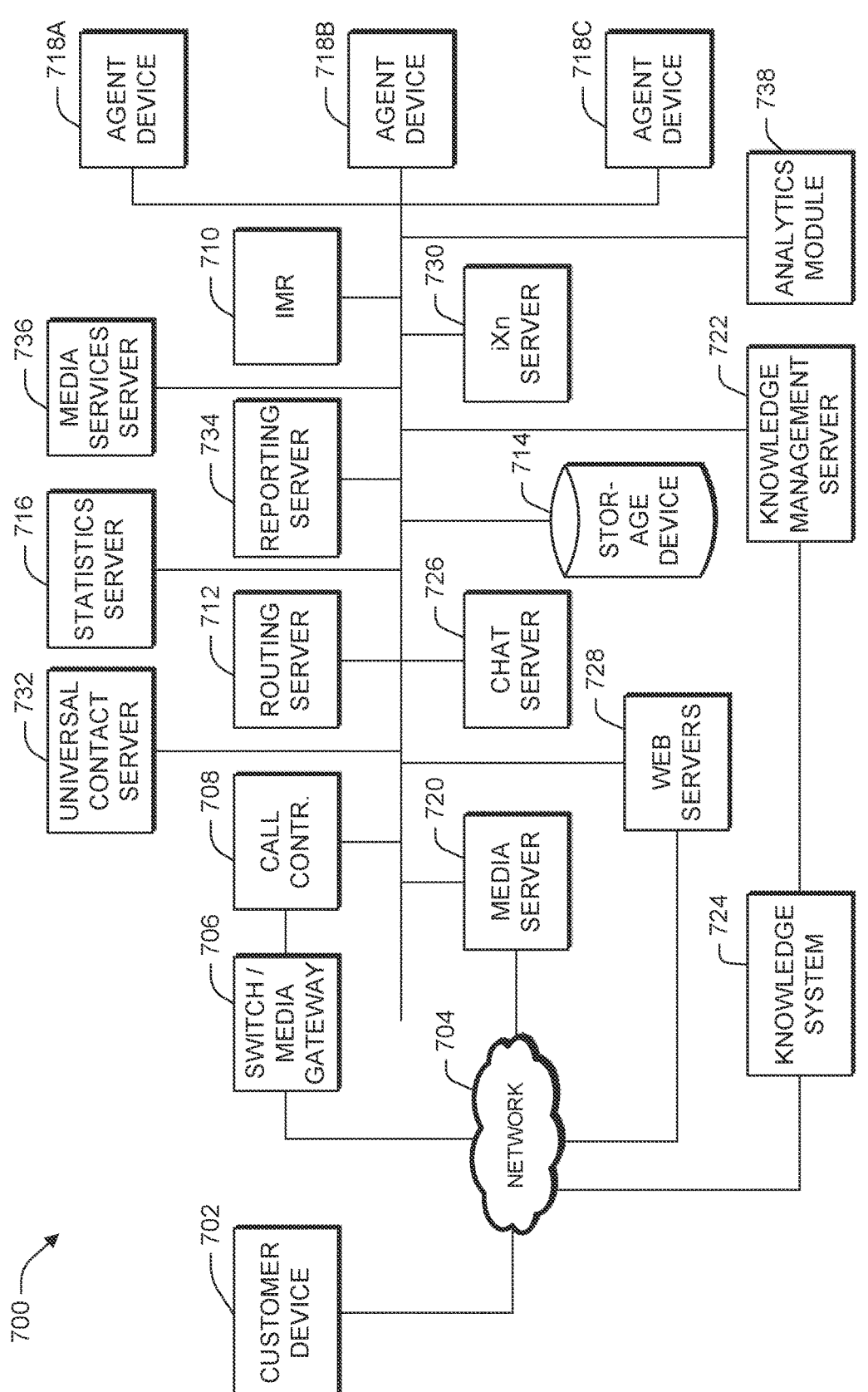
FIG. 7 is a block diagram of an example contact center system.

FIG. 7 shows an example communications infrastructure and/or contact center system 700 that may be used in conjunction with one or more of the embodiments described herein. The contact center system 700 can be embodied as any system capable of providing contact center services (e.g., call center services, chat center services, SMS center services, etc.) to a customer and otherwise performing the functions described herein. The illustrated contact center system 700 includes a customer device 702, a network 704, a switch/media gateway 706, a call controller 708, an interactive media response (IMR) server 710, a routing server 712, a storage device 714, a statistics server 716, agent devices 718A, 718B, 718C, a media server 720, a knowledge management server 722, a knowledge system 724, a chat server 726, web servers 728, an interaction (iXn) server 730, a universal contact server 732, a reporting server 734, a media services server 736, and an analytics module 738. Although only one customer device 702, one network 704, one switch/media gateway 706, one call controller 708, one IMR server 710, one routing server 712, one storage device 714, one statistics server 716, one media server 720, one knowledge management server 722, one knowledge system 724, one chat server 726, one iXn server 730, one universal contact server 732, one reporting server 734, one media services server 736, and one analytics module 738 are shown in the illustrated example of FIG. 7, the contact center system 700 may include multiple customer devices 702, networks 704, switch/media gateways 706, call controllers 708, IMR servers 710, routing servers 712, storage devices 714, statistics servers 716, media servers 720, knowledge management servers 722, knowledge systems 724, chat servers 726, iXn servers 730, universal contact servers 732, reporting servers 734, media services servers 736, and/or analytics modules 738 in other examples. Further, in some examples, one or more of the components described herein may be excluded from the system 700, one or more of the components described as being independent may form a portion of another component, and/or one or more of the component described as forming a portion of another component may be independent.

The term "contact center system" is used herein to refer to the system depicted in FIG. 7 and/or the components thereof, while the term "contact center" is used more generally to refer to contact center systems, customer service providers operating those systems, and/or the organizations or enterprises associated therewith. Thus, unless otherwise specifically limited, the term "contact center" refers generally to a contact center system (such as the contact center system 700), the associated customer service provider (such as a particular customer service provider/agent providing customer services through the contact center system 700), as well as the organization or enterprise on behalf of which those customer services are being provided.

By way of background, customer service providers may offer many types of services through contact centers. Such contact centers may be staffed with employees or customer service agents (herein referred to simply as "agents"), with the agents serving as an interface between a company, enterprise, government agency, or organization ("business"). Such contact centers may be contacted by persons seeking assistance from agents (herein referred to as "customers" or "users"). For example, the agents at a contact center may assist customers in making purchasing decisions, receiving orders, or solving problems with products or services already received. Within a contact center, such interactions between contact center agents and customers may be conducted over a variety of communication channels, such as, for example, via a voice channel (e.g., telephone calls or voice over IP or VOIP calls), video (e.g., video conferencing), text (e.g., emails and text chat), screen sharing, co-browsing, and/or other communication channels.

Operationally, contact centers generally strive to provide quality assistance services to customers while minimizing costs. For example, one way for a contact center to operate is to handle every customer interaction with a live agent. While this approach may score well in terms of the service quality, it can be prohibitively expensive due to the high cost of agent labor. Because of this, contact centers can utilize some level of automated processes in place of live agents, such as, for example, interactive voice response (IVR) systems, interactive media response (IMR) systems, internet robots or "bots," automated chat modules or "chatbots," and/or other automated processes. Such automated processes can be efficient in handling certain types of interactions and effective at decreasing the need for live agents. Such automation allows contact centers to target the use of human agents for the more difficult customer interactions, while the automated processes handle the more repetitive or routine tasks. Further, automated processes can be structured in a way that optimizes efficiency and promotes repeatability. Whereas a human or live agent may forget to ask certain questions or follow-up on particular details, such mistakes are typically avoided through the use of automated processes. While customer service providers increasingly rely on automated processes to interact with customers, the use of such technologies by customers remains far less developed. Thus, while IVR systems, IMR systems, and/or bots are used to automate portions of the interaction on the contact center-side of an interaction, actions on the customer-side remain for the customer to perform manually.

The contact center system 700 can be used by a customer service provider to provide various types of services to customers. For example, the contact center system 700 can be used to engage and manage interactions in which automated processes (or bots) or human agents communicate with customers. The contact center system 700 can be an in-house facility to a business for performing the functions of sales and customer service relative to products and services available through the business. In other examples, the contact center system 700 can be operated by a third-party service provider that contracts to provide services for another organization. Further, the contact center system 700 can be deployed on equipment dedicated to the business or third-party service provider, and/or deployed in a remote computing environment such as, for example, a private or public cloud environment with infrastructure for supporting multiple contact centers for multiple business. The contact center system 700 can include software applications or programs that may be executed on-premises, remotely, or some combination thereof. The various components of the contact center system 700 can be distributed across various geographic locations and need not necessarily be contained in a single location or computing environment.

Unless otherwise specifically limited, any of the computing elements of the present invention may be implemented in cloud-based or cloud computing environments. As used herein and further described below in reference to the computing device 800, "cloud computing"—or, simply, the "cloud"—is defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. Cloud computing can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.). Often referred to as a "serverless architecture," a cloud execution model generally includes a service provider dynamically managing an allocation and provisioning of remote servers for achieving a desired functionality.

Figure 8:
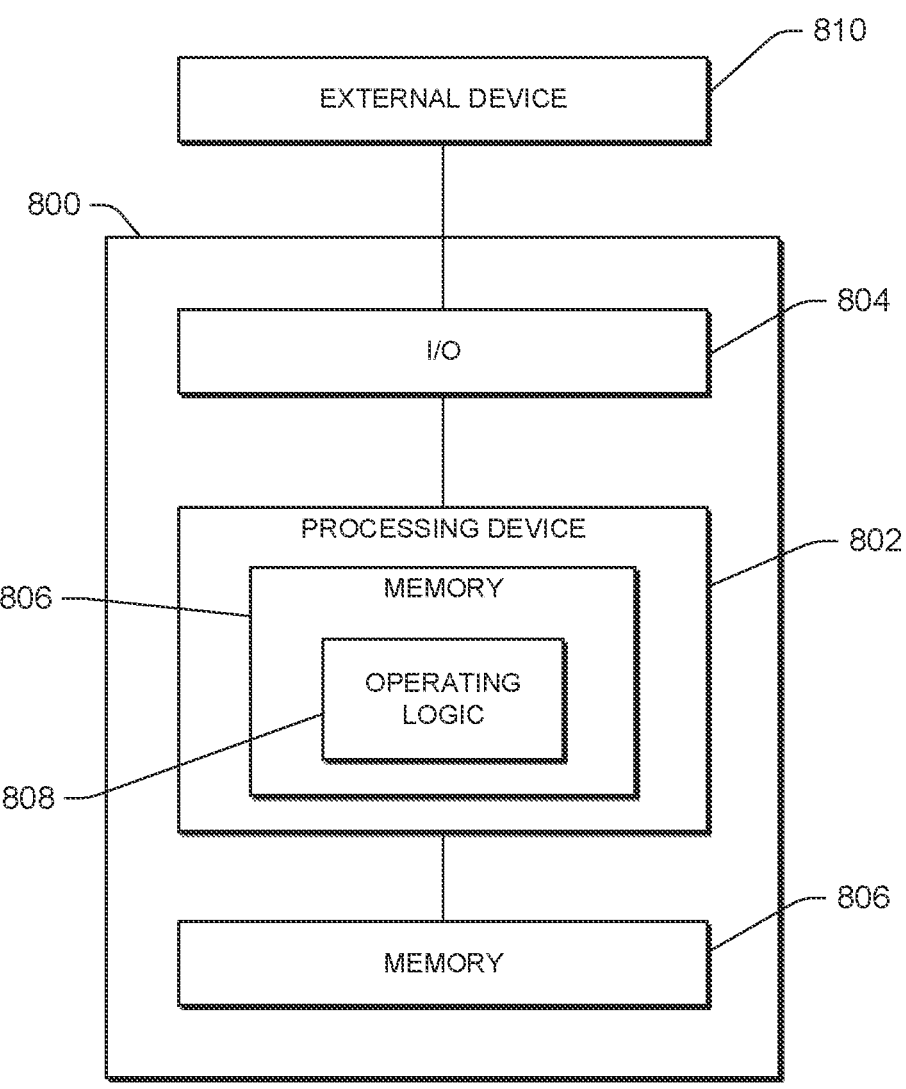
FIG. 8 is a block diagram of an example computing device.

Any of the computer-implemented components, modules, or servers described in relation to FIG. 7 can be implemented via one or more types of computing devices, such as, for example, the computing device 800 of FIG. 8. The contact center system 700 can manage resources (e.g., personnel, computers, telecommunication equipment, etc.) to enable delivery of services via telephone, email, chat, or other communication mechanisms. Such services may vary depending on the type of contact center and, for example, may include customer service, help desk functionality, emergency response, telemarketing, order taking, and/or other characteristics.

Customers desiring to receive assistance services from the contact center system 700 may initiate inbound communications (e.g., telephone calls, emails, chats, etc.) to the contact center system 700 via a customer device 702. While FIG. 7 shows one such customer device (i.e., customer device 702) any number of customer devices 702 may be present. The customer devices 702, for example, may be a communication device, such as a telephone, smart phone, computer, tablet, or laptop. In accordance with functionality described herein, customers may generally use the customer devices 702 to initiate, manage, and conduct communications with the contact center system 700, such as telephone calls, emails, chats, text messages, web-browsing sessions, and other multi-media transactions. For example, customer device 702 can correspond to customer device 224 of FIG. 2.

Inbound and outbound communications from and to the customer devices 702 may traverse the network 704, with the nature of the network typically depending on the type of customer device being used and the form of communication. As an example, the network 704 may include a communication network of telephone, cellular, and/or data services. The network 704 may be a private or public switched telephone network (PSTN), local area network (LAN), private wide area network (WAN), and/or public WAN such as the Internet. Further, the network 704 may include a wireless carrier network including a code division multiple access (CDMA) network, global system for mobile communications (GSM) network, or any wireless network/technology conventional in the art, including but not limited to 3G, 4G, LTE, 5G, etc.

The switch/media gateway 706 may be coupled to the network 704 for receiving and transmitting telephone calls between customers and the contact center system 700. The switch/media gateway 706 may include a telephone or communication switch configured to function as a central switch for agent level routing within the contact center. The switch may be a hardware switching system or implemented via software. For example, the switch 706 may include an automatic call distributor, a private branch exchange (PBX), an IP-based software switch, and/or any other switch with specialized hardware and software configured to receive Internet-sourced interactions and/or telephone network-sourced interactions from a customer, and route those interactions to, for example, one of the agent devices 718A, 718B, 718C. Thus, in general, the switch/media gateway 706 establishes a voice connection between the customer and the agent by establishing a connection between the customer device 702 and agent devices 718A, 718B, 718C. Any of the agent devices 718A, 718B, 718C can correspond, for example, to agent device 116 of FIG. 1, or to another device used by the agent to access cloud system 104 in FIG. 1 or 204 in FIG. 2.

As further shown in FIG. 7, the switch/media gateway 706 may be coupled to the call controller 708 which, for example, serves as an adapter or interface between the switch and the other routing, monitoring, and communication-handling components of the contact center system 700. The call controller 708 may be configured to process PSTN calls, VOIP calls, and/or other types of calls. For example, the call controller 708 may include computer-telephone integration (CTI) software for interfacing with the switch/media gateway and other components. The call controller 708 may include a session initiation protocol (SIP) server for processing SIP calls. The call controller 708 may also extract data about an incoming interaction, such as the customer's telephone number, IP address, or email address, and then communicate these with other contact center components in processing the interaction.

The interactive media response (IMR) server 710 may be configured to enable self-help or virtual assistant functionality. Specifically, the IMR server 710 may be similar to an interactive voice response (IVR) server, except that the IMR server 710 is not restricted to voice and may also cover a variety of media channels. In an example illustrating voice, the IMR server 710 may be configured with an IMR script for querying customers on their needs. For example, a contact center for a bank may instruct customers via the IMR script to "press 1" if such customers wish to retrieve their account balance. Through continued interaction with the IMR server 710, customers may receive service without needing to speak with an agent. The IMR server 710 may also be configured to ascertain why a customer is contacting the contact center so that the communication may be routed to the appropriate resource. The IMR configuration may be performed through the use of a self-service and/or assisted service tool which comprises a web-based tool for developing IVR applications and routing applications running in the contact center environment.

The routing server 712 may function to route incoming interactions. For example, once it is determined that an inbound communication should be handled by a human agent, functionality within the routing server 712 may select the most appropriate agent and route the communication thereto. This agent selection may be based on which available agent is best suited for handling the communication. More specifically, the selection of appropriate agent may be based on a routing strategy or algorithm that is implemented by the routing server 712. In doing this, the routing server 712 may query data that is relevant to the incoming interaction, for example, data relating to the particular customer, available agents, and the type of interaction, which, as described herein, may be stored in particular databases. Once the agent is selected, the routing server 712 may interact with the call controller 708 to route (i.e., connect) the incoming interaction to the corresponding agent device 718A, 718B, 718C. As part of this connection, information about the customer may be provided to the selected agent via their agent device 718A, 718B, 718C. This information is intended to enhance the service the agent is able to provide to the customer.

The contact center system 700 may include one or more mass storage devices—represented generally by the storage device 714—for storing data in one or more databases relevant to the functioning of the contact center. For example, the storage device 714 may store customer data that is maintained in a customer database. Such customer data may include, for example, customer profiles, contact information, service level agreement (SLA), and interaction history (e.g., details of previous interactions with a particular customer, including the nature of previous interactions, disposition data, wait time, handle time, and actions taken by the contact center to resolve customer issues). As another example, the storage device 714 may store agent data in an agent database. Agent data maintained by the contact center system 700 may include, for example, agent availability and agent profiles, schedules, skills, handle time, and/or other relevant data. As another example, the storage device 714 may store interaction data in an interaction database. Interaction data may include, for example, data relating to numerous past interactions between customers and contact centers. More generally, unless otherwise specified, the storage device 714 may be configured to include databases and/or store data related to any of the types of information described herein, with those databases and/or data being accessible to the other modules or servers of the contact center system 700 in ways that facilitate the functionality described herein. For example, the servers or modules of the contact center system 700 may query such databases to retrieve data stored therein or transmit data thereto for storage. The storage device 714, for example, may take the form of any conventional storage medium and may be locally housed or operated from a remote location. As an example, the databases may be Cassandra database, NoSQL database, or a SQL database and managed by a database management system, such as, Oracle, IBM DB2, Microsoft SQL server, or Microsoft Access, PostgreSQL.

The statistics server 716 may be configured to record and aggregate data relating to the performance and operational aspects of the contact center system 700. Such information may be compiled by the statistics server 716 and made available to other servers and modules, such as the reporting server 734, which then may use the data to produce reports that are used to manage operational aspects of the contact center and execute automated actions in accordance with functionality described herein. Such data may relate to the state of contact center resources, e.g., average wait time, abandonment rate, agent occupancy, and others as functionality described herein would require.

The agent devices 718A, 718B, 718C of the contact center system 700 may be communication devices configured to interact with the various components and modules of the contact center system 700 in ways that facilitate functionality described herein. An agent device 718A, 718B, 718C, for example, may include a telephone adapted for regular telephone calls or VOIP calls. An agent device 718A, 718B, 718C may further include a computing device configured to communicate with the servers of the contact center system 700, perform data processing associated with operations, and interface with customers via voice, chat, email, and other multimedia communication mechanisms according to functionality described herein. Although FIG. 7 shows three such agent devices 718A, 718B, and 718C, any number of agent devices may be present in a particular embodiment.

The multimedia/social media server 720 may be configured to facilitate media interactions (other than voice) with the customer devices 702 and/or the servers 728. Such media interactions may be related, for example, to email, voice mail, chat, video, text-messaging, web, social media, co-browsing, etc. The multimedia/social media server 720 may take the form of any IP router conventional in the art with specialized hardware and software for receiving, processing, and forwarding multi-media events and communications.

The knowledge management server 722 may be configured to facilitate interactions between customers and the knowledge system 724. In general, the knowledge system 724 may be a computer system capable of receiving questions or queries and providing answers in response. The knowledge system 724 may be included as part of the contact center system 700 or operated remotely by a third party. The knowledge system 724 may include an artificially intelligent computer system capable of answering questions posed in natural language by retrieving information from information sources such as encyclopedias, dictionaries, newswire articles, literary works, or other documents submitted to the knowledge system 724 as reference materials. As an example, the knowledge system 724 may be embodied as IBM Watson or a similar system.

The chat server 726 may be configured to conduct, orchestrate, and manage electronic chat communications with customers. In general, the chat server 726 is configured to implement and maintain chat conversations and generate chat transcripts. Such chat communications may be conducted by the chat server 726 in such a way that a customer communicates with automated chatbots, human agents, or both. In some examples, the chat server 726 may perform as a chat orchestration server that dispatches chat conversations among the chatbots and available human agents. In such cases, the processing logic of the chat server 726 may be rules driven so to leverage an intelligent workload distribution among available chat resources. The chat server 726 further may implement, manage, and facilitate user interfaces (UIs) associated with the chat feature, including those UIs generated at either the customer device 702 or the agent device 718A, 718B, or 718C. The chat server 726 may be configured to transfer chats within a single chat session with a particular customer between automated and human sources such that, for example, a chat session transfers from a chatbot to a human agent or from a human agent to a chatbot. The chat server 726 may also be coupled to the knowledge management server 722 and the knowledge systems 724 for receiving suggestions and answers to queries posed by customers during a chat so that, for example, links to relevant articles can be provided.

The web servers 728 may be included to provide site hosts for a variety of social interaction sites to which customers subscribe, such as Facebook, Twitter, Instagram, etc. Though depicted as part of the contact center system 700, the web servers 728 may be provided by third parties and/or maintained remotely. The web servers 728 may also provide webpages for the enterprise or organization being supported by the contact center system 700. For example, customers may browse the webpages and receive information about the products and services of a particular enterprise. Within such enterprise webpages, mechanisms may be provided for initiating an interaction with the contact center system 700, for example, via web chat, voice, or email. An example of such a mechanism is a widget, which can be deployed on the webpages or websites hosted on the web servers 728. As used herein, a widget refers to a user interface component that performs a particular function. In some implementations, a widget may include a graphical user interface control that can be overlaid on a webpage displayed to a customer via the internet. The widget may show information, such as in a window or text box, or include buttons or other controls that allow the customer to access certain functionalities, such as sharing or opening a file or initiating a communication. In some implementations, a widget includes a user interface component having a portable portion of code that can be installed and executed within a separate webpage without compilation. Some widgets can include corresponding or additional user interfaces and be configured to access a variety of local resources (e.g., a calendar or contact information on the customer device) or remote resources via network (e.g., instant messaging, electronic mail, or social networking updates).

The interaction (iXn) server 730 may be configured to manage deferrable activities of the contact center and the routing thereof to human agents for completion. As used herein, deferrable activities may include back-office work that can be performed off-line, e.g., responding to emails, attending training, and other activities that do not entail real-time communication with a customer. As an example, the interaction (iXn) server 730 may be configured to interact with the routing server 712 for selecting an appropriate agent to handle each of the deferrable activities. Once assigned to a particular agent, the deferrable activity is pushed to that agent so that it appears on the agent device 718A, 718B, or 718C of the selected agent. The deferrable activity may appear in a workbin as a task for the selected agent to complete. The functionality of the workbin may be implemented via any conventional data structure, such as, for example, a linked list, array, and/or other suitable data structure. Each of the agent devices 718A, 718B, 718C may include a workbin. As an example, a workbin may be maintained in the buffer memory of the corresponding agent device 718A, 718B, or 718C.

The universal contact server (UCS) 732 may be configured to retrieve information stored in the customer database and/or transmit information thereto for storage therein. For example, the UCS 732 may be utilized as part of the chat feature to facilitate maintaining a history on how chats with a particular customer were handled, which then may be used as a reference for how future chats should be handled. More generally, the UCS 732 may be configured to facilitate maintaining a history of customer preferences, such as preferred media channels and best times to contact. To do this, the UCS 732 may be configured to identify data pertinent to the interaction history for each customer such as, for example, data related to comments from agents, customer communication history, and the like. Each of these data types then may be stored in the customer database 714 or on other modules and retrieved as functionality described herein requires.

The reporting server 734 may be configured to generate reports from data compiled and aggregated by the statistics server 716 or other sources. Such reports may include near real-time reports or historical reports and concern the state of contact center resources and performance characteristics, such as, for example, average wait time, abandonment rate, and/or agent occupancy. The reports may be generated automatically or in response to specific requests from a requestor (e.g., agent, administrator, contact center application, etc.). The reports then may be used toward managing the contact center operations in accordance with functionality described herein.

The media services server 736 may be configured to provide audio and/or video services to support contact center features. In accordance with functionality described herein, such features may include prompts for an IVR or IMR system (e.g., playback of audio files), hold music, voice-mails/single party recordings, multi-party recordings (e.g., of audio and/or video calls), screen recording, speech recognition, dual tone multi frequency (DTMF) recognition, faxes, audio and video transcoding, secure real-time transport protocol (SRTP), audio conferencing, video conferencing, coaching (e.g., support for a coach to listen in on an interaction between a customer and an agent and for the coach to provide comments to the agent without the customer hearing the comments), call analysis, keyword spotting, and/or other relevant features.

The analytics module 738 may be configured to provide systems and methods for performing analytics on data received from a plurality of different data sources as functionality described herein may require. In accordance with example embodiments, the analytics module 738 also may generate, update, train, and modify predictors or models based on collected data, such as, for example, customer data, agent data, and interaction data. The models may include behavior models of customers or agents. The behavior models may be used to predict behaviors of, for example, customers or agents, in a variety of situations, thereby allowing embodiments of the present invention to tailor interactions based on such predictions or to allocate resources in preparation for predicted characteristics of future interactions, thereby improving overall contact center performance and the customer experience. Although the analytics module is described as being part of a contact center, such behavior models also may be implemented on customer systems (or, as also used herein, on the "customer-side" of the interaction) and used for the benefit of customers.

According to exemplary embodiments, the analytics module 738 may have access to the data stored in the storage device 714, including the customer database and agent database. The analytics module 738 also may have access to the interaction database, which stores data related to interactions and interaction content (e.g., transcripts of the interactions and events detected therein), interaction metadata (e.g., customer identifier, agent identifier, medium of interaction, length of interaction, interaction start and end time, department, tagged categories), and the application setting (e.g., the interaction path through the contact center). Further, the analytics module 738 may be configured to retrieve data stored within the storage device 714 for use in developing and training algorithms and models, for example, by applying machine learning techniques.

One or more of the included models may be configured to predict customer or agent behavior and/or aspects related to contact center operation and performance. Further, one or more of the models may be used in natural language processing and, for example, include intent recognition and the like. The models may be developed based upon known first principle equations describing a system; data, resulting in an empirical model; or a combination of known first principle equations and data. In developing a model for use with present embodiments, because first principles equations are often not available or easily derived, it may be generally preferred to build an empirical model based upon collected and stored data. To properly capture the relationship between the manipulated/disturbance variables and the controlled variables of complex systems, in some embodiments, it may be preferable that the models are nonlinear. This is because nonlinear models can represent curved rather than straight-line relationships between manipulated/disturbance variables and controlled variables, which are common to complex systems such as those discussed herein. Given the foregoing requirements, a machine learning or neural network-based approach may be a preferred embodiment for implementing the models. Neural networks, for example, may be developed based upon empirical data using advanced regression algorithms.

The analytics module 738 may further include an optimizer. An optimizer may be used to minimize a "cost function" subject to a set of constraints, where the cost function is a mathematical representation of desired objectives or system operation. Because the models may be non-linear, the optimizer may be a nonlinear programming optimizer. It is contemplated, however, that the technologies described herein may be implemented by using, individually or in combination, a variety of different types of optimization approaches, including, but not limited to, linear programming, quadratic programming, mixed integer non-linear programming, stochastic programming, global non-linear programming, genetic algorithms, particle/swarm techniques, and the like.

According to some embodiments, the models and the optimizer may together be used within an optimization system. For example, the analytics module 738 may utilize the optimization system as part of an optimization process by which aspects of contact center performance and operation are optimized or, at least, enhanced. This, for example, may include features related to the customer experience, agent experience, interaction routing, natural language processing, intent recognition, or other functionality related to automated processes.

The various components, modules, and/or servers of FIG. 7 (as well as the other figures included herein) may each include one or more processors executing computer program instructions and interacting with other system components for performing the various functionalities described herein. Such computer program instructions may be stored in a memory implemented using a standard memory device, such as, for example, a random-access memory (RAM), or stored in other non-transitory computer readable media such as, for example, a CD-ROM, flash drive, etc. Although the functionality of each of the servers is described as being provided by the particular server, a person of skill in the art should recognize that the functionality of various servers may be combined or integrated into a single server, or the functionality of a particular server may be distributed across one or more other servers without departing from the scope of the present invention. Further, the terms "interaction" and "communication" are used interchangeably, and generally refer to any real-time and non-real-time interaction that uses any communication channel including, without limitation, telephone calls (PSTN or VoIP calls), emails, vmails, video, chat, screen-sharing, text messages, social media messages, WebRTC calls, etc. Access to and control of the components of the contact center system 700 may be affected through user interfaces (UIs) which may be generated on the customer device 702 and/or the agent devices 718A, 718B, 718C.

As noted above, in some embodiments, the contact center system 700 may operate as a hybrid system in which some or all components are hosted remotely, such as in a cloud-based or cloud computing environment. Each of the devices of the contact center system 700 may be embodied as, include, or form a portion of one or more computing devices similar to the computing device 800 described below in reference to FIG. 8.

FIG. 8 shows an example computing device 800. The illustrated computing device 800 depicts at least one embodiment of each of the computing devices, systems, servicers, controllers, switches, gateways, engines, modules, and/or computing components described herein (e.g., which collectively may be referred to interchangeably as computing devices, servers, or modules for brevity of the description). For example, the various computing devices may be a process or thread running on one or more processors of one or more computing devices 800, which may be executing computer program instructions and interacting with other system modules in order to perform the various functionalities described herein. Unless otherwise specifically limited, the functionality described in relation to a plurality of computing devices may be integrated into a single computing device, or the various functionalities described in relation to a single computing device may be distributed across several computing devices. Further, in relation to the computing systems described herein, such as the contact center system 700 of FIG. 7, the various servers and computer devices thereof may be located on local computing devices 800 (e.g., on-site at the same physical location as the agents of the contact center), remote computing devices 800 (e.g., off-site or in a cloud-based or cloud computing environment, for example, in a remote data center connected via a network), or some combination thereof. In some embodiments, functionality provided by servers located on computing devices off-site may be accessed and provided over a virtual private network (VPN), as if such servers were on-site, or the functionality may be provided using a software as a service (SaaS) accessed over the Internet using various protocols, such as by exchanging data via extensible markup language (XML), JSON, and/or the functionality may be otherwise accessed/leveraged.

In some embodiments, the computing device 800 may be embodied as a server, desktop computer, laptop computer, tablet computer, notebook, netbook, Ultrabook™, cellular phone, mobile computing device, smartphone, wearable computing device, personal digital assistant, Internet of Things (IoT) device, processing system, wireless access point, router, gateway, and/or any other computing, processing, and/or communication device capable of performing the functions described herein.

The computing device 800 includes a processing device 802 that executes algorithms and/or processes data in accordance with operating logic 808, an input/output device 804 that enables communication between the computing device 800 and one or more external devices 810, and memory 806 which stores, for example, data received from the external device 810 via the input/output device 804.

The input/output device 804 allows the computing device 800 to communicate with the external device 810. For example, the input/output device 804 may include a transceiver, a network adapter, a network card, an interface, one or more communication ports (e.g., a USB port, serial port, parallel port, an analog port, a digital port, VGA, DVI, HDMI, FireWire, CAT 5, or any other type of communication port or interface), and/or other communication circuitry. Communication circuitry of the computing device 800 may be configured to use any one or more communication technologies (e.g., wireless or wired communications) and associated protocols (e.g., Ethernet, Bluetooth®, Wi-Fi®, WiMAX, etc.) to effect such communication depending on the particular computing device 800. The input/output device 804 may include hardware, software, and/or firmware suitable for performing the techniques described herein.

The external device 810 may be any type of device that allows data to be inputted or outputted from the computing device 800. For example, in various embodiments, the external device 810 may be embodied as one or more of the devices/systems described herein, and/or a portion thereof. Further, in some embodiments, the external device 810 may be embodied as another computing device, switch, diagnostic tool, controller, printer, display, alarm, peripheral device (e.g., keyboard, mouse, touch screen display, etc.), and/or any other computing, processing, and/or communication device capable of performing the functions described herein. Furthermore, in some embodiments, the external device 810 may be integrated into the computing device 800.

The processing device 802 may be embodied as any type of processor(s) capable of performing the functions described herein. In particular, the processing device 802 may be embodied as one or more single or multi-core processors, microcontrollers, or other processor or processing/controlling circuits. For example, in some embodiments, the processing device 802 may include or be embodied as an arithmetic logic unit (ALU), central processing unit (CPU), digital signal processor (DSP), graphics processing unit (GPU), field-programmable gate array (FPGA), application-specific integrated circuit (ASIC), and/or another suitable processor(s). The processing device 802 may be a programmable type, a dedicated hardwired state machine, or a combination thereof. Processing devices 802 with multiple processing units may utilize distributed, pipelined, and/or parallel processing in various embodiments. Further, the processing device 802 may be dedicated to performance of just the operations described herein, or may be utilized in one or more additional applications. In the illustrated embodiment, the processing device 802 is programmable and executes algorithms and/or processes data in accordance with operating logic 808 as defined by programming instructions (such as software or firmware) stored in memory 806. Additionally or alternatively, the operating logic 808 for processing device 802 may be at least partially defined by hardwired logic or other hardware. Further, the processing device 802 may include one or more components of any type suitable to process the signals received from input/output device 804 or from other components or devices and to provide desired output signals. Such components may include digital circuitry, analog circuitry, or a combination thereof.

The memory 806 may be of one or more types of non-transitory computer-readable media, such as a solid-state memory, electromagnetic memory, optical memory, or a combination thereof. Furthermore, the memory 806 may be volatile and/or nonvolatile and, in some embodiments, some or all of the memory 806 may be of a portable type, such as a disk, tape, memory stick, cartridge, and/or other suitable portable memory. In operation, the memory 806 may store various data and software used during operation of the computing device 800 such as operating systems, applications, programs, libraries, and drivers. The memory 806 may store data that is manipulated by the operating logic 808 of processing device 802, such as, for example, data representative of signals received from and/or sent to the input/output device 804 in addition to or in lieu of storing programming instructions defining operating logic 808. As shown in FIG. 8, the memory 806 may be included with the processing device 802 and/or coupled to the processing device 802 depending on the particular embodiment. For example, in some embodiments, the processing device 802, the memory 806, and/or other components of the computing device 800 may form a portion of a system-on-a-chip (SoC) and be incorporated on a single integrated circuit chip.

In some embodiments, various components of the computing device 800 (e.g., the processing device 802 and the memory 806) may be communicatively coupled via an input/output subsystem, which may be embodied as circuitry and/or components to facilitate input/output operations with the processing device 802, the memory 806, and other components of the computing device 800. For example, the input/output subsystem may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations.

The computing device 800 may include other or additional components, such as those commonly found in a typical computing device (e.g., various input/output devices and/or other components), in other embodiments. One or more of the components of the computing device 800 described herein may be distributed across multiple computing devices. In other words, the techniques described herein may be employed by a computing system that includes one or more computing devices. Additionally, although only a single processing device 802, I/O device 804, and memory 806 are shown in FIG. 8, a particular computing device 800 may include multiple processing devices 802, I/O devices 804, and/or memories 806 in other embodiments. Further, in some embodiments, more than one external device 810 may be in communication with the computing device 800.

The computing device 800 may be one of a plurality of devices connected by a network or connected to other systems/resources via a network. The network may be embodied as any one or more types of communication networks that are capable of facilitating communication between the various devices communicatively connected via the network. As such, the network may include one or more networks, routers, switches, access points, hubs, computers, client devices, endpoints, nodes, and/or other intervening network devices. For example, the network may be embodied as or otherwise include one or more cellular networks, telephone networks, local or wide area networks, publicly available global networks (e.g., the Internet), ad hoc networks, short-range communication links, or a combination thereof. In some embodiments, the network may include a circuit-switched voice or data network, a packet-switched voice or data network, and/or any other network able to carry voice and/or data. In particular, in some embodiments, the network may include Internet Protocol (IP)-based and/or asynchronous transfer mode (ATM)-based networks. In some embodiments, the network may handle voice traffic (e.g., via a Voice over IP (VOIP) network), web traffic, and/or other network traffic depending on the particular embodiment and/or devices of the system in communication with one another. In various embodiments, the network may include analog or digital wired and wireless networks (e.g., IEEE 802.11 networks, Public Switched Telephone Network (PSTN), Integrated Services Digital Network (ISDN), and Digital Subscriber Line (xDSL)), Third Generation (3G) mobile telecommunications networks, Fourth Generation (4G) mobile telecommunications networks, Fifth Generation (5G) mobile telecommunications networks, a wired Ethernet network, a private network (e.g., such as an intranet), radio, television, cable, satellite, and/or any other delivery or tunneling mechanism for carrying data, or any appropriate combination of such networks. The various devices/systems may communicate with one another via different networks depending on the source and/or destination devices/systems.

The computing device 800 may communicate with other computing devices 800 via any type of gateway or tunneling protocol such as secure socket layer or transport layer security. The network interface may include a built-in network adapter, such as a network interface card, suitable for interfacing the computing device to any type of network capable of performing the operations described herein. Further, the network environment may be a virtual network environment where the various network components are virtualized. For example, the various machines may be virtual machines implemented as a software-based computer running on a physical machine. The virtual machines may share the same operating system, or, in other embodiments, different operating system may be run on each virtual machine instance. For example, a "hypervisor" type of virtualizing is used where multiple virtual machines run on the same host physical machine, each acting as if it has its own dedicated box. Other types of virtualization may be employed in other embodiments, such as, for example, the network (e.g., via software defined networking) or functions (e.g., via network functions virtualization).

Accordingly, one or more of the computing devices 800 described herein may be embodied as, or form a portion of, one or more cloud-based systems. In cloud-based embodiments, the cloud-based system may be embodied as a server-ambiguous computing solution, for example, that executes a plurality of instructions on-demand, contains logic to execute instructions only when prompted by a particular activity/trigger, and does not consume computing resources when not in use. That is, system may be embodied as a virtual computing environment residing "on" a computing system (e.g., a distributed network of devices) in which various virtual functions (e.g., Lambda functions, Azure functions, Google cloud functions, and/or other suitable virtual functions) may be executed corresponding with the functions of the system described herein. For example, when an event occurs (e.g., data is transferred to the system for handling), the virtual computing environment may be communicated with (e.g., via a request to an API of the virtual computing environment), whereby the API may route the request to the correct virtual function (e.g., a particular server-ambiguous computing resource) based on a set of rules. As such, when a request for the transmission of data is made by a user (e.g., via an appropriate user interface to the system), the appropriate virtual function(s) may be executed to perform the actions before eliminating the instance of the virtual function(s).

Portions of the architectures 100, 200 of FIGS. 1 and 2 can be implemented using the call center architecture 700 of FIG. 7, and computing devices 108, 116, 208, 220, 224 therein can be implemented using computing device 800 of FIG. 8.

FIG. 9 illustrates a method 900 for authenticating a contact center customer to a contact center agent. A cloud system can trigger 902 the sending of an electronic message to a customer device. The cloud system is one to which the agent is securely authenticated. The customer device has one or more biometric authentication features. The customer device stores a private key of a passkey pair, and requires biometric authentication to access the private key. The electronic message contains a validation link. A passkey system can receive 904 a positive authentication status from a business web server 904. The passkey system may be run, for example, on the cloud. The business web server may, for example, communicate to the passkey system over the internet and via one or more public APIs. In response to the passkey system receiving the positive authentication status from the business web server indicating that the business web server has authenticated the customer device by passkey, the passkey system can store 906 an agent identifier, a customer identifier, an interaction identifier and a credential identifier in a database. The database can be, for example, a NoSQL database hosted on the cloud. Further in response to the passkey system receiving the positive authentication status, the passkey system can transmit 908 an authentication status notification indicating the positive authentication status to the cloud system.

Figure 10:
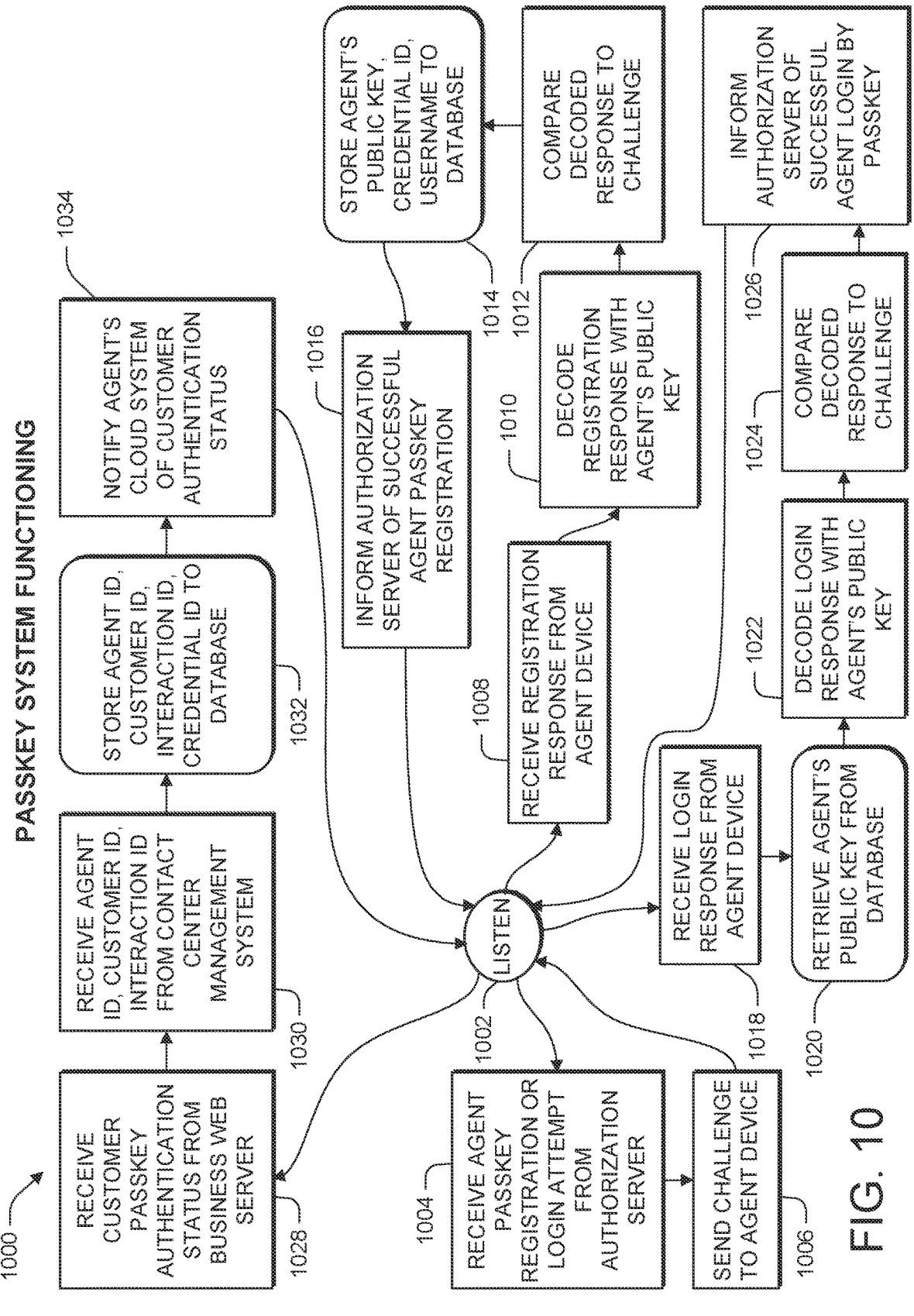
FIG. 10 is a state machine diagram illustrating example functioning of a passkey system.

FIG. 10 is a state machine diagram 1000 illustrating example functioning of a passkey system, such as passkey system 112 of FIG. 1 or passkey system 212 of FIG. 2, which can be one and the same passkey system. The passkey system listens 1002 for requests, e.g., from an authorization server (e.g., authorization server 110 in FIG. 1) or a public API, or for notifications, e.g., from a business web server (e.g., business web server 220 in FIG. 2), which may be via a public API. Upon receiving 1004 a request corresponding to an agent passkey registration attempt or an agent passkey login attempt, which, in either case, can include an agent username, the passkey system can generate and send 1006 a challenge (a registration challenge or login challenge, depending on the request) to an agent device (e.g., agent device 116 in FIG. 1) and can then return to listening 1002. Not shown in FIG. 10, the passkey system may, in some examples, temporarily store the challenge in a database (e.g., database 114 in FIG. 1 or 214 in FIG. 2, which can be the same) to which the passkey system is coupled until such time as a response is received from the agent device.

Upon receiving 1008 a registration response (including an encoded registration challenge and a public key) from an agent device, which may come via an authentication server or public API, the passkey system can decode 1010 the registration challenge using the agent's public key and compare 1012 the decoded challenge to the original registration challenge sent 1006 to declare the validity of the registration based on the decoded challenge matching the original registration challenge. The passkey system can then store 1014 the agent's public key, a credential ID, and the agent's username to the database. The passkey system can inform 1016 the authorization server of the successful agent passkey registration and return to listening 1002. The authorization server can subsequently log the agent in by passkey.

Upon receiving 1018 a login response (including an encoded login challenge) from an agent device, which may come via an authentication server or public API, the passkey system can retrieve 1020 the agent's public key from the database, decode 1022 the login challenge using the agent's public key, and compare 1024 the decoded challenge to the original login challenge sent 1006 to declare the validity of the login based on the decoded challenge matching the original login challenge. The passkey system can then inform 1026 the authorization server of the successful agent passkey login and return to listening 1002. The authorization server can thus log the agent in by passkey.

Upon receiving 1028 a notification of a successful customer passkey authentication from a business web server (e.g., business web server 220 in FIG. 2), the passkey system can receive 1030 an agent ID, a customer ID, and an interaction ID from contact center management system (e.g., contact center management system 218 in FIG. 2). The notification from the business web server can include a credential ID. The passkey system can store 1032 the agent ID, the customer ID, the interaction ID, and the credential ID to the database (e.g., database 214 in FIG. 2). The passkey system can then notify 1034 the agent's cloud system (e.g., cloud system 204 in FIG. 2) of the successful customer authentication status. The passkey system can then return to listening 1002.

In some examples, the passkey system can have respective input and output queues to order or triage the processing of received requests and notifications. In some examples, the passkey system can process requests and/or notifications in parallel. For example, different instances of the passkey system can execute contemporaneously to process requests and/or notifications in parallel.

The passkey-based contact center authentication systems and methods described herein enrich existing contact center authorization mechanisms by incorporating passkey authentication, protecting contact center agents and customers from social engineering attacks like phishing, sniffing, and keylogging. The passkey-based contact center authentication systems and methods described herein improve the customer authentication experience by obviating the need for customers to share personal details (e.g., security question answers) with agents or to remember passwords for verifying their identity. Additionally, because passkeys need never expire and cannot be easily stolen, the passkey-based contact center authentication systems and methods described herein make the agent login experience more secure and more seamless. By eliminating the need for storing passwords and ensuring password strength and routine password changes, the passkey-based contact center authentication systems and methods described herein reduce costs and time associated with password management systems. The passkey-based contact center authentication systems and methods described herein also simplify business systems by eliminating the need to issue and store one-time passwords and tokens.

What is claimed is:

1. A method for authenticating a contact center user to a contact center agent during a particular interaction between the contact center user and the contact center agent, the method comprising:

triggering, by a cloud system to which the contact center agent is securely authenticated by a passkey system, a sending of an electronic message to a user device of the contact center user, the user device having one or more biometric authentication features, wherein the user device stores a private key of a passkey pair and requires biometric authentication to access the private key, wherein the electronic message contains a validation link or a trigger for a validation prompt, and wherein the passkey system is hosted in a cloud with a contact center management system;

storing, by the passkey system that facilitates identity authentication based on private key and public key pairs, an agent identifier that identifies the contact center agent, a user identifier that identifies the contact center user, an interaction identifier that identifies the particular interaction between the contact center user and the contact center agent, and a credential identifier associated with a corresponding public key in a database in response to the passkey system receiving a positive authentication status from a business web server indicating that the business web server has authenticated the user device by passkey, wherein the passkey system receives the agent identifier, the user identifier and the interaction identifier in response to triggering the sending of the electronic message, and wherein the credential identifier and public key is retrieved from the database by the passkey system in association with authenticating the contact center agent; and transmitting, by the passkey system, an authentication status notification indicating the positive authentication status to the cloud system in response to the passkey system receiving the positive authentication status.

2. The method of claim 1, wherein the electronic message is sent via a message communication channel that is based on a type of interaction communication channel by which the user interacts with the agent.

3. The method of claim 2, wherein the electronic message contains the validation link and is sent via a short message service (SMS) text message or an email message.

4. The method of claim 2, wherein the electronic message contains the trigger for the validation prompt and is sent as a push notification to a client-side script in a web browser.

5. The method of claim 1, further comprising, prior to the sending of the electronic message to the user device, authenticating the agent by:

providing, by a login portal of the cloud system, an option to sign in using a passkey;

receiving, by the passkey system, a username from the login portal;

retrieving, by the passkey system, a credential identifier and an agent public key from the database;

sending, by the passkey system, a login challenge to an agent device;

receiving, by the passkey system, a signed login challenge from the agent device;

decoding, by the passkey system, the signed login challenge using the agent public key; and comparing, by the passkey system, the decoded login challenge with the sent login challenge.

6. A system for authenticating a contact center user to a contact center agent during a particular interaction between the contact center user and the contact center agent, the system comprising:

at least one processor; and at least one memory comprising a plurality of instructions stored therein that, in response to execution by the at least one processor, causes the system to:

trigger, by a cloud system to which the contact center agent is securely authenticated by a passkey system, a sending of an electronic message to a user device of the contact center user, the user device having one or more biometric authentication features, wherein the user device stores a private key of a passkey pair and requires biometric authentication to access the private key, wherein the electronic message contains a validation link or a trigger for a validation prompt and wherein the passkey system is hosted in a cloud with a contact center management system;

store, by the passkey system that facilitates identity authentication based on private key and public key pairs, an agent identifier that identifies the contact center agent, a user identifier that identifies the contact center user, an interaction identifier that identifies the particular interaction between the contact center user and the contact center agent, and a credential identifier associated with a corresponding public key in a database in response to the passkey system receiving a positive authentication status from a business web server indicating that the business web server has authenticated the user device by passkey, wherein the passkey system receives the agent identifier, the user identifier and the interaction identifier in response to triggering the sending of the electronic message, and wherein the credential identifier and public key is retrieved from the database by the passkey system in association with authentication of the contact center agent; and transmit, by the passkey system, an authentication status notification indicating the positive authentication status to the cloud system in response to the passkey system receiving the positive authentication status.

7. The system of claim 6, wherein the electronic message is sent via a message communication channel that is based on a type of interaction communication channel by which the user interacts with the agent.

8. The system of claim 7, wherein the electronic message contains the validation link and is sent via a short message service (SMS) text message or an email message.

9. The system of claim 7, wherein the electronic message contains the trigger for the validation prompt and is sent as a push notification to a client-side script in a web browser.

10. The system of claim 6, wherein the cloud system comprises a login portal, and wherein the passkey system is configured to:

provide an option to sign in using a passkey;

receive a username from the login portal;

retrieve a credential identifier and an agent public key from the database;

send a login challenge to an agent device;

receive a signed login challenge from the agent device;

decode the signed login challenge using the agent public key; and compare the decoded login challenge with the sent login challenge.

11. One or more non-transitory computer-readable storage media comprising a plurality of instructions stored thereon and hosted in a cloud that, in response to execution by at least one processor, cause the at least one processor to authenticate a contact center user to a contact center agent during a particular interaction between the contact center user and the contact center agent by:

triggering, with a cloud system to which the contact center agent is securely authenticated by a passkey system, a sending of an electronic message to a user device of the contact center user, the user device having one or more biometric authentication features, wherein the user device stores a private key of a passkey pair and requires biometric authentication to access the private key, wherein the electronic message contains a validation link or a trigger for a validation prompt, and wherein the passkey system is hosted in a cloud with a contact center management system;

storing, with the passkey system, an agent identifier that identifies the contact center agent, a user identifier that identifies that contact center user, an interaction identifier that identifies the particular interaction between the contact center user and the contact center agent, and a credential identifier associated with a corresponding public key of a public key and private key pair in a database in response to receiving a positive authentication status from a business web server indicating that the business web server has authenticated the user device by passkey, wherein the passkey system receives the agent identifier, the user identifier and the interaction identifier in response to triggering the sending of the electronic message, and wherein the credential identifier and public key is retrieved from the database by the passkey system in association with authentication of the contact center agent; and transmitting, with the passkey system, an authentication status notification indicating the positive authentication status.

12. The one or more computer-readable storage media of claim 11, wherein the plurality of instructions further cause the at least one processor to send the electronic message via a message communication channel that is based on a type of interaction communication channel by which the user interacts with the agent.

13. The one or more computer-readable storage media of claim 12, wherein the plurality of instructions further cause the at least one processor to send the electronic message containing the validation link as a short message service (SMS) text message or as an email message.

14. The one or more computer-readable storage media of claim 12, wherein the plurality of instructions further cause the at least one processor to send the electronic message containing the trigger for the validation prompt as a push notification to a client-side script in a web browser.

15. The one or more computer-readable storage media of claim 11, wherein the plurality of instructions further cause the at least one processor to:

provide an option to sign in using a passkey;

receive a username from a login portal;

retrieve a credential identifier and an agent public key from the database;

send a login challenge to an agent device;

receive a signed login challenge from the agent device;

decode the signed login challenge using the agent public key; and compare the decoded login challenge with the sent login challenge.

* * * * *